(12) United States Patent
Bellos et al.

(10) Patent No.: US 12,170,433 B2
(45) Date of Patent: Dec. 17, 2024

(54) AMPLITUDE-MODULATED LASER

(71) Applicant: Quantum-Si Incorporated, Guilford, CT (US)

(72) Inventors: Michael Bellos, Lebanon, CT (US); Alexander Goryaynov, New Haven, CT (US); Benjamin Cipriany, Branford, CT (US); Xinghua Shi, Madison, CT (US); Faisal R. Ahmad, Guilford, CT (US)

(73) Assignee: Quantum-Si Incorporated, Branford, CT (US)

( * ) Notice: Subject to any disclaimer, the term of this patent is extended or adjusted under 35 U.S.C. 154(b) by 508 days.

(21) Appl. No.: 17/148,515

(22) Filed: Jan. 13, 2021

(65) Prior Publication Data
US 2021/0218218 A1   Jul. 15, 2021

Related U.S. Application Data

(60) Provisional application No. 62/961,179, filed on Jan. 14, 2020.

(51) Int. Cl.
*H01S 3/098* (2006.01)
*H01S 3/00* (2006.01)
(Continued)

(52) U.S. Cl.
CPC ........ *H01S 3/10038* (2013.01); *H01S 3/0085* (2013.01); *H01S 3/0813* (2013.01);
(Continued)

(58) Field of Classification Search
CPC .. H01S 3/10038; H01S 3/0085; H01S 3/0813; H01S 3/105; H01S 3/1068;
(Continued)

(56) References Cited

U.S. PATENT DOCUMENTS

| 4,034,949 A | 7/1977 | Hoesterey et al. |
| 4,118,109 A | 10/1978 | Crawford et al. |

(Continued)

FOREIGN PATENT DOCUMENTS

| CN | 1242884 A | 1/2000 |
| CN | 101387750 A | 3/2009 |

(Continued)

OTHER PUBLICATIONS

U.S. Appl. No. 17/566,765, filed Dec. 31, 2021, Rothberg et al.
(Continued)

*Primary Examiner* — Kinam Park
(74) *Attorney, Agent, or Firm* — Wolf, Greenfield & Sacks, P.C.

(57) ABSTRACT

Systems and methods are described for producing an amplitude-modulated laser pulse train. The laser pulse train can be used to cause fluorescence in materials at which the pulse trains are directed. The parameters of the laser pulse train are selected to increase fluorescence relative to a constant-amplitude laser pulse train. The amplitude-modulated laser pulse trains produced using the teachings of this invention can be used to enable detection of specific molecules in applications such as gene or protein sequencing.

16 Claims, 20 Drawing Sheets

(51) Int. Cl.
*H01S 3/081* (2006.01)
*H01S 3/10* (2006.01)
*H01S 3/105* (2006.01)
*H01S 3/106* (2006.01)
*H01S 3/107* (2006.01)
*H01S 3/1115* (2023.01)
*H01S 3/1118* (2023.01)
*G01N 21/64* (2006.01)

(52) U.S. Cl.
CPC ............ *H01S 3/105* (2013.01); *H01S 3/1068* (2013.01); *H01S 3/107* (2013.01); *H01S 3/1115* (2013.01); *H01S 3/1118* (2013.01); *G01N 21/6402* (2013.01); *G01N 2021/6421* (2013.01)

(58) Field of Classification Search
CPC ...... H01S 3/107; H01S 3/1115; H01S 3/0405; H01S 3/1611; H01S 3/1673; H01S 3/115
See application file for complete search history.

(56) References Cited

U.S. PATENT DOCUMENTS

| | | | |
|---|---|---|---|
| 4,295,226 | A | 10/1981 | Dombrowski |
| 4,850,686 | A | 7/1989 | Morimoto et al. |
| 5,108,179 | A | 4/1992 | Myers |
| 5,196,709 | A | 3/1993 | Berndt et al. |
| 5,471,515 | A | 11/1995 | Fossum et al. |
| 5,627,853 | A | 5/1997 | Mooradian et al. |
| 5,674,743 | A | 10/1997 | Ulmer |
| 5,822,472 | A | 10/1998 | Danielzik et al. |
| 5,854,651 | A | 12/1998 | Kessler et al. |
| 5,961,924 | A | 10/1999 | Reichert et al. |
| 6,175,670 | B1 | 1/2001 | Bergmann |
| 6,185,235 | B1 | 2/2001 | Cheng et al. |
| 6,205,266 | B1 | 3/2001 | Palen et al. |
| 6,355,420 | B1 * | 3/2002 | Chan ................ G01N 21/6428 435/6.12 |
| 6,393,035 | B1 | 5/2002 | Weingarten et al. |
| 6,437,345 | B1 | 8/2002 | Bruno-Raimondi et al. |
| 6,473,250 | B1 | 10/2002 | Chapman et al. |
| 6,545,759 | B1 | 4/2003 | Hartman |
| 6,618,423 | B1 | 9/2003 | Dekorsky et al. |
| 6,628,850 | B1 | 9/2003 | Yao |
| 6,715,685 | B2 | 4/2004 | Dvorkis |
| 6,716,394 | B2 | 4/2004 | Jensen et al. |
| 6,750,969 | B2 | 6/2004 | Richard et al. |
| 6,787,308 | B2 | 9/2004 | Balasubramanian et al. |
| 6,825,921 | B1 | 11/2004 | Modlin et al. |
| 6,834,064 | B1 | 12/2004 | Paschotta et al. |
| 6,847,450 | B2 | 1/2005 | Richard et al. |
| 6,917,726 | B2 | 7/2005 | Levene et al. |
| 7,052,847 | B2 | 5/2006 | Korlach et al. |
| 7,170,050 | B2 | 1/2007 | Turner et al. |
| 7,175,811 | B2 | 2/2007 | Bach et al. |
| 7,179,654 | B2 | 2/2007 | Verdonk et al. |
| 7,394,841 | B1 | 7/2008 | Konttinen et al. |
| 7,426,322 | B2 | 9/2008 | Hyde |
| 7,595,883 | B1 | 9/2009 | El Gamal et al. |
| 7,738,086 | B2 | 6/2010 | Shepard et al. |
| 7,742,510 | B2 | 6/2010 | Essaian et al. |
| 7,820,983 | B2 | 10/2010 | Lundquist et al. |
| 7,834,329 | B2 | 11/2010 | Lundquist et al. |
| 7,838,847 | B2 | 11/2010 | Lundquist et al. |
| 7,873,085 | B2 | 1/2011 | Babushkin et al. |
| 7,968,702 | B2 | 6/2011 | Wegener et al. |
| 7,981,604 | B2 | 7/2011 | Quake |
| 8,053,742 | B2 | 11/2011 | Lundquist et al. |
| 8,207,509 | B2 | 6/2012 | Lundquist et al. |
| 8,252,911 | B2 | 8/2012 | Bjornson et al. |
| 8,274,040 | B2 | 9/2012 | Zhong et al. |
| 8,278,728 | B2 | 10/2012 | Murshid |
| 8,279,901 | B2 | 10/2012 | Karavitis |
| 8,325,337 | B2 | 12/2012 | Sinfield et al. |
| 8,465,699 | B2 | 6/2013 | Fehr et al. |
| 8,471,219 | B2 | 6/2013 | Lundquist et al. |
| 8,471,230 | B2 | 6/2013 | Zhong et al. |
| 8,501,406 | B1 | 8/2013 | Gray et al. |
| 8,502,169 | B2 | 8/2013 | Rigneault et al. |
| 8,618,507 | B1 | 12/2013 | Lundquist et al. |
| 8,865,077 | B2 | 10/2014 | Chiou et al. |
| 8,953,651 | B2 | 2/2015 | Karavitis |
| 9,029,802 | B2 | 5/2015 | Lundquist et al. |
| 9,054,479 | B2 | 6/2015 | Karavitis |
| 9,157,864 | B2 | 10/2015 | Fehr et al. |
| 9,222,123 | B2 | 12/2015 | Zhong et al. |
| 9,222,133 | B2 | 12/2015 | Lundquist et al. |
| 9,223,084 | B2 | 12/2015 | Grot et al. |
| 9,318,867 | B2 | 4/2016 | Pronin et al. |
| 9,325,148 | B2 | 4/2016 | Karavitis |
| 9,372,308 | B1 | 6/2016 | Saxena et al. |
| 9,587,276 | B2 | 3/2017 | Lundquist et al. |
| 9,606,060 | B2 | 3/2017 | Chen et al. |
| 9,617,594 | B2 | 4/2017 | Rothberg et al. |
| 9,658,161 | B2 | 5/2017 | Saxena et al. |
| 9,666,748 | B2 | 5/2017 | Leobandung |
| 9,719,138 | B2 | 8/2017 | Zhong et al. |
| 9,765,395 | B2 | 9/2017 | Goldsmith |
| 9,946,017 | B2 | 4/2018 | Saxena et al. |
| 10,018,764 | B2 | 7/2018 | Grot et al. |
| 10,090,429 | B2 | 10/2018 | Leobandung |
| 10,138,515 | B2 | 11/2018 | Fehr et al. |
| 10,246,742 | B2 | 4/2019 | Rothberg et al. |
| 10,280,457 | B2 | 5/2019 | Zhong et al. |
| 10,283,928 | B2 * | 5/2019 | Rothberg ................ H01S 3/025 |
| 10,310,178 | B2 | 6/2019 | Saxena et al. |
| 10,487,356 | B2 | 11/2019 | Lundquist et al. |
| 10,551,624 | B2 | 2/2020 | Rothberg et al. |
| 10,578,788 | B2 | 3/2020 | Grot et al. |
| 10,605,730 | B2 | 3/2020 | Rothberg et al. |
| 10,655,172 | B2 | 5/2020 | Rank et al. |
| 10,712,433 | B2 | 7/2020 | Carothers |
| 10,724,090 | B2 | 7/2020 | McCaffrey et al. |
| 10,741,990 | B2 | 8/2020 | Rothberg et al. |
| 10,775,305 | B2 | 9/2020 | Rothberg et al. |
| 11,249,318 | B2 | 2/2022 | Rothberg et al. |
| 11,322,906 | B2 | 5/2022 | Rothberg et al. |
| 11,466,316 | B2 | 10/2022 | Rothberg et al. |
| 11,567,006 | B2 | 1/2023 | Rothberg et al. |
| 11,747,561 | B2 | 9/2023 | Schmid et al. |
| 11,808,700 | B2 | 11/2023 | Rothberg et al. |
| 11,848,531 | B2 | 12/2023 | Rothberg et al. |
| 2001/0050821 | A1 | 12/2001 | Bickleder et al. |
| 2002/0141473 | A1 | 10/2002 | Cordingley et al. |
| 2002/0176088 | A1 | 11/2002 | Johnson et al. |
| 2002/0182716 | A1 | 12/2002 | Weisbuch et al. |
| 2003/0058904 | A1 | 3/2003 | Krainer et al. |
| 2003/0151053 | A1 | 8/2003 | Sun et al. |
| 2003/0169784 | A1 | 9/2003 | Sutter et al. |
| 2003/0174992 | A1 | 9/2003 | Levene et al. |
| 2003/0179786 | A1 | 9/2003 | Kopf |
| 2004/0028090 | A1 | 2/2004 | Pask et al. |
| 2004/0047387 | A1 | 3/2004 | Bunting et al. |
| 2004/0169842 | A1 | 9/2004 | Dosluoglu et al. |
| 2004/0257140 | A1 | 12/2004 | Bergmann et al. |
| 2005/0048529 | A1 | 3/2005 | McSwiggen |
| 2006/0000814 | A1 | 1/2006 | Gu et al. |
| 2006/0029110 | A1 | 2/2006 | Cho et al. |
| 2006/0269190 | A1 | 11/2006 | Kim et al. |
| 2008/0130099 | A1 | 6/2008 | Harter |
| 2008/0175284 | A1 | 7/2008 | Konttinen et al. |
| 2008/0198466 | A1 | 8/2008 | Plotkin et al. |
| 2008/0317072 | A1 | 12/2008 | Essaian et al. |
| 2009/0180500 | A1 | 7/2009 | Babushkin et al. |
| 2009/0225799 | A1 | 9/2009 | Hasegawa |
| 2010/0021180 | A1 | 1/2010 | Uemura et al. |
| 2010/0065726 | A1 | 3/2010 | Zhong et al. |
| 2010/0173394 | A1 | 7/2010 | Colston et al. |
| 2010/0245354 | A1 | 9/2010 | Rousso et al. |
| 2010/0254022 | A1 | 10/2010 | O'Shaughnessy |
| 2010/0255487 | A1 | 10/2010 | Beechem et al. |
| 2010/0327762 | A1 | 12/2010 | Yang |

(56) References Cited

U.S. PATENT DOCUMENTS

| | | | |
|---|---|---|---|
| 2011/0136201 A1 | 6/2011 | Mao et al. | |
| 2011/0165652 A1 | 7/2011 | Hardin et al. | |
| 2011/0170566 A1 | 7/2011 | Holtom | |
| 2011/0206070 A1 | 8/2011 | Karavitis | |
| 2011/0206071 A1 | 8/2011 | Karavitis | |
| 2011/0206072 A1 | 8/2011 | Karavitis | |
| 2011/0206073 A1 | 8/2011 | Karavitis | |
| 2011/0224519 A1* | 9/2011 | Adachi | G01N 33/84 600/340 |
| 2011/0236983 A1 | 9/2011 | Beechem et al. | |
| 2012/0014837 A1 | 1/2012 | Fehr et al. | |
| 2012/0039345 A1 | 2/2012 | Fan et al. | |
| 2012/0081040 A1 | 4/2012 | Ku | |
| 2012/0154062 A1* | 6/2012 | Wilkinson | G04G 7/02 331/94.1 |
| 2012/0282391 A1 | 11/2012 | Palmaz et al. | |
| 2013/0051411 A1 | 2/2013 | Kim et al. | |
| 2013/0071849 A1 | 3/2013 | Kong et al. | |
| 2013/0101252 A1 | 4/2013 | Rasras et al. | |
| 2013/0116153 A1 | 5/2013 | Bowen et al. | |
| 2014/0024020 A1 | 1/2014 | Tanabe | |
| 2014/0050235 A1* | 2/2014 | Clowes | G02F 1/353 372/6 |
| 2014/0154792 A1 | 6/2014 | Moynihan et al. | |
| 2014/0286364 A1 | 9/2014 | Pronin et al. | |
| 2015/0116682 A1 | 4/2015 | Slonaker | |
| 2015/0293021 A1 | 10/2015 | Finkelstein et al. | |
| 2015/0355469 A1 | 12/2015 | Oguri et al. | |
| 2016/0002088 A1 | 1/2016 | Mizumura et al. | |
| 2016/0084761 A1 | 3/2016 | Rothberg et al. | |
| 2016/0231549 A1 | 8/2016 | Bosworth et al. | |
| 2016/0238532 A1* | 8/2016 | Freudiger | G02B 21/16 |
| 2016/0266316 A1 | 9/2016 | Wohlfeil et al. | |
| 2016/0336709 A1 | 11/2016 | Manni | |
| 2016/0341664 A1* | 11/2016 | Rothberg | H01L 27/14603 |
| 2016/0344156 A1* | 11/2016 | Rothberg | H01S 3/1305 |
| 2016/0369332 A1 | 12/2016 | Rothberg et al. | |
| 2017/0146479 A1 | 5/2017 | Levine et al. | |
| 2017/0160541 A1 | 6/2017 | Carothers et al. | |
| 2017/0322153 A1* | 11/2017 | Rothberg | G01N 21/6428 |
| 2018/0115136 A1 | 4/2018 | Delfyett et al. | |
| 2018/0173000 A1 | 6/2018 | Rothberg et al. | |
| 2018/0175582 A1* | 6/2018 | Rothberg | H01S 3/08072 |
| 2019/0249240 A1 | 8/2019 | Rothberg et al. | |
| 2019/0292590 A1 | 9/2019 | Zhong et al. | |
| 2019/0383737 A1 | 12/2019 | Rothberg et al. | |
| 2019/0391328 A1 | 12/2019 | Li et al. | |
| 2020/0124864 A1 | 4/2020 | Rothberg et al. | |
| 2020/0158640 A1 | 5/2020 | Rothberg et al. | |
| 2020/0220317 A1 | 7/2020 | Rothberg et al. | |
| 2020/0335933 A1 | 10/2020 | Rothberg et al. | |
| 2020/0393616 A1 | 12/2020 | Schmid et al. | |
| 2021/0277463 A1 | 9/2021 | Rothberg et al. | |
| 2022/0128828 A1 | 4/2022 | Rothberg et al. | |
| 2022/0209492 A1 | 6/2022 | Rothberg et al. | |
| 2023/0152224 A1 | 5/2023 | Rothberg et al. | |
| 2023/0358958 A1 | 11/2023 | Schmid et al. | |
| 2024/0068943 A1 | 2/2024 | Rothberg et al. | |
| 2024/0079843 A1 | 3/2024 | Rothberg et al. | |

FOREIGN PATENT DOCUMENTS

| | | |
|---|---|---|
| CN | 101414729 A | 4/2009 |
| CN | 101572380 A | 11/2009 |
| CN | 101636886 A | 1/2010 |
| CN | 101915752 A | 12/2010 |
| CN | 101938081 A | 1/2011 |
| CN | 102549478 A | 7/2012 |
| CN | 102789055 A | 11/2012 |
| CN | 102832536 A | 12/2012 |
| CN | 103502471 A | 1/2014 |
| CN | 103765704 A | 4/2014 |
| CN | 203774604 U | 8/2014 |
| CN | 104078839 A | 10/2014 |
| CN | 104201547 A | 12/2014 |
| CN | 104518419 A | 4/2015 |
| CN | 102292671 | 10/2015 |
| CN | 105588570 A | 5/2016 |
| CN | 106029904 A | 10/2016 |
| CN | 107851965 A | 3/2018 |
| CN | 107923850 A | 4/2018 |
| DE | 10 2009 036273 A1 | 2/2011 |
| EP | 0472318 A2 | 2/1992 |
| EP | 0542480 A2 | 5/1993 |
| EP | 0601714 A1 | 6/1994 |
| EP | 1681356 A1 | 7/2006 |
| EP | 2182523 A1 | 5/2010 |
| EP | 2 767 822 A1 | 8/2014 |
| EP | 3296783 A1 | 3/2018 |
| ES | 2329206 A1 | 11/2009 |
| IE | 2006/0447 A1 | 4/2009 |
| JP | S63-17581 A | 1/1988 |
| JP | S63-78147 U | 5/1988 |
| JP | H05-243660 A | 9/1993 |
| JP | H05-275780 A | 10/1993 |
| JP | H05-283766 A | 10/1993 |
| JP | H07-221374 A | 8/1995 |
| JP | H08-506664 A | 7/1996 |
| JP | H08-340154 A | 12/1996 |
| JP | H10-3022 A | 1/1998 |
| JP | H10-96610 A | 4/1998 |
| JP | H11-505370 A | 5/1999 |
| JP | 2000-155052 A2 | 6/2000 |
| JP | 2001-25102 A | 1/2001 |
| JP | 2001-077449 A | 3/2001 |
| JP | 2001-142035 A | 5/2001 |
| JP | 2001-251002 A | 9/2001 |
| JP | 2002-050128 A | 2/2002 |
| JP | 2002-239773 A | 8/2002 |
| JP | 2002-368313 A | 12/2002 |
| JP | 2003-500861 A | 1/2003 |
| JP | 2003-168840 A | 6/2003 |
| JP | 2003-177328 A | 6/2003 |
| JP | 2004-520709 A | 7/2004 |
| JP | 2004-363419 A | 12/2004 |
| JP | 2005-512086 A | 4/2005 |
| JP | 2005-524051 A | 8/2005 |
| JP | 2006-48885 A | 2/2006 |
| JP | 2007-511079 A | 4/2007 |
| JP | 2007-520735 A | 7/2007 |
| JP | 2008-28379 A | 2/2008 |
| JP | 2009-122493 A | 6/2009 |
| JP | 2009-277754 A | 11/2009 |
| JP | 2010-103291 A | 5/2010 |
| JP | 2010-204006 A | 9/2010 |
| JP | 2010-233843 A | 10/2010 |
| JP | 2011-119393 A | 6/2011 |
| JP | 2011-518445 A | 6/2011 |
| JP | 2011-519312 A | 7/2011 |
| JP | 2011-185842 A | 9/2011 |
| JP | 2011-229660 A | 11/2011 |
| JP | 2012-32183 | 2/2012 |
| JP | 2012-98299 A | 5/2012 |
| JP | 2012-132741 A | 7/2012 |
| JP | 2010-074198 A | 8/2012 |
| JP | 2012-150186 A | 8/2012 |
| JP | 2012-242626 A | 12/2012 |
| JP | 2013-104876 A | 5/2013 |
| JP | 2013-518302 A | 5/2013 |
| JP | 2013-520848 A | 6/2013 |
| JP | 2014-507824 A | 3/2014 |
| JP | 2014-150210 A | 8/2014 |
| JP | 2014-531777 A | 11/2014 |
| JP | 2015-015337 A | 1/2015 |
| JP | 2015-501415 A | 1/2015 |
| JP | 2016-502290 A | 1/2016 |
| JP | 2017-525958 A | 9/2017 |
| JP | 2017-531356 A | 10/2017 |
| KR | 10-2005-0094097 A | 9/2005 |
| KR | 590565 B1 | 6/2006 |
| KR | 10-2006-0121900 A | 11/2006 |
| KR | 10-2018-0009772 | 1/2018 |
| TW | 200909794 A | 3/2009 |

(56) References Cited

FOREIGN PATENT DOCUMENTS

| | | |
|---|---|---|
| TW | 201022719 A | 6/2010 |
| TW | 201440942 A | 11/2014 |
| TW | 201804740 A | 2/2018 |
| TW | 201831938 A | 9/2018 |
| WO | WO 94/18218 A1 | 8/1994 |
| WO | WO 02/11252 A2 | 2/2002 |
| WO | WO 03/021212 A1 | 3/2003 |
| WO | WO 2005/073407 A1 | 8/2005 |
| WO | WO 2008/087253 A1 | 7/2008 |
| WO | WO 2011/091316 A2 | 7/2011 |
| WO | WO 2011/153962 A1 | 12/2011 |
| WO | WO 2012/133292 A1 | 4/2012 |
| WO | WO 2014/100725 A1 | 6/2014 |
| WO | WO 2014/107294 A2 | 7/2014 |
| WO | WO 2014/142981 A1 | 9/2014 |
| WO | WO 2016/023010 A1 | 2/2016 |
| WO | WO 2016/187564 A1 | 11/2016 |

OTHER PUBLICATIONS

U.S. Appl. No. 17/696,755, filed Mar. 16, 2022, Rothberg et al.
PCT/US2020/030345, Dec. 23, 2021, International Preliminary Report on Patentability.
International Preliminary Report on Patentability for International Application No. PCT/US2020/030345 mailed Dec. 23, 2021.
Invitation to Pay Additional Fees for International Application No. PCT/US2016/033576 dated Aug. 24, 2016.
International Search Report and Written Opinion for International Application No. PCT/US2016/033576 dated Nov. 4, 2016.
International Preliminary Report on Patentability for International Application No. PCT/US2016/033576 dated Nov. 30, 2017.
Invitation to Pay Additional Fees for International Application No. PCT/US2016/033585 dated Sep. 21, 2016.
International Search Report and Written Opinion for International Application No. PCT/US2016/033585 dated Nov. 11, 2016.
International Preliminary Report on Patentability for International Application No. PCT/US2016/033585 dated Nov. 30, 2017.
International Preliminary Report on Patentability for International Application No. PCT/US2017/066348 dated Jun. 27, 2019.
International Search Report and Written Opinion for International Application No. PCT/US2017/066878 dated Mar. 15, 2018.
International Preliminary Report on Patentability for International Application No. PCT/US2017/066878 dated Jun. 27, 2019.
Invitation to Pay Additional Fees for International Application No. PCT/US2019/037354 dated Sep. 25, 2019.
International Search Report and Written Opinion for International Application No. PCT/US2019/037354 mailed Nov. 19, 2019.
International Preliminary Report on Patentability for International Application No. PCT/US2019/037354 dated Dec. 24, 2020.
International Search Report and Written Opinion for International Application No. PCT/US2017/066348 dated May 4, 2018.
Invitation to Pay Additional Fees for International Application No. PCT/US2017/066348 dated Mar. 8, 2018.
Invitation to Pay Additional Fees for International Application No. PCT/US2020/030345 dated Aug. 13, 2020.
International Search Report and Written Opinion for International Application No. PCT/US2020/030345 dated Oct. 19, 2020.
Invitation to Pay Additional Fees for International Application No. PCT/US2021/013320 dated May 10, 2021.
International Search Report and Written Opinion for International Application No. PCT/US2021/013320 dated Jul. 1, 2021.
[No Author Listed] Semiconductor Components Industries, LLC, MC10EP05, MC100EP05. 3.3V/5V ECL 2-input differential and/nand. Aug. 2008. 11 Pages.
Araki et al., An ultraviolet nanosecond light pulse generator using a light emiting diode for test of photodetectors. Rev. Sci. Instr. Mar. 1997;68:1364-8.
Binh et al., A simple sub-nanosecond ultraviolet light pulse generator with high repetition rate and peak power. Rev. Sci. Instr. 2013;84:083102.1-083102.5.
Champak et al., Ultrafast pulse generation in a mode-locked Erbium chip waveguide laser. Opt. Express 24. 2016. 8 pages.
Hale, Fibre Optic Sensors using Adiabatically Tapered Single Mode Fibres. Dissertation submitted to the University of Cambridge. Feb. 1994. 209 pages.
Huang et al., Gene expression analysis with an integrated CMOS microarray by time-resolved fluorescence detection. Biosensors and Bioelectronics. 2012;26(5):2660-5.
Huang et al., Slab-coupled Optical Waveguide Lasers Emerge from a Multimode Sea. www.photonics.com, Oct. 2006. 10 Pages.
Kwon et al., Ultrashort stretched-pulse L-band laser using carbon-nanotube saturable absorber. Opt. Express 23, 7779-7785. 2015.
Lu et al., Terahertz Microchip for Illicit Drug Detection. IEEE Photonics Technology Letters. 2006;18(21):2254-6.
Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.
Pfeufer et al., A ddT ddA ddG ddC Length-sorted strands fow through a capillary Detector Final output Focused laser beam Fluorescence Fluorescently teminated oligonucleotides Original DNA strand Genetics/DNA Sequencing. 2015;24-7.
Sauer et al., Time-Resolved Identification of Individual Mononucleotide Molecules in Aqueous Solution with Pulsed Semiconductor Lasers. Bioimaging, Institute of Physics. 1998;6(1):14-24.
Taillaert et al., Grating couplers for coupling between optical fibers and nanophotonic waveguides. Japanese Journal of Applied Physics. 2006;45(8A):6071-7.
Taitt et al., Evanescent wave fluorescence biosensors. Biosens Bioelectron. Jun. 2005;20(12):2470-87. Epub Dec. 8, 2004.
Uhring et al., A low-cost high-repetition-rate picosecond laser diode pulse generator. Optical Sensing II. 2004;5452:583-90.
Villafana-Rauda et al., Dynamics of a Q-switched Nd: YVO4/Cr: YAG laser under periodic modulation. Results in Physics. Mar. 1, 2019;12:908-13.
Zhang et al., Square-wave pulse with ultra-wide tuning range in a passively mode-locked fiber laser. Optics letters. Apr. 15, 2012;37(8):1334-6.
Extended European Search Report for European Application No. 21217400.7 dated Jul. 28, 2022.
International Preliminary Report on Patentability for International Application No. PCT/US2021/013320 mailed Jul. 28, 2022.
Rae et al., A vertically integrated CMOS microsystem for time-resolved fluorescence analysis. IEEE Transactions on Biomedical Circuits and Systems. Nov. 22, 2010;4(6):437-44.
Stultz et al., Short pulse, high-repetition rate, passively Q-switched Er: yttrium-aluminum-garnet laser at 1.6 microns. Applied Physics Letters. Dec. 12, 2005;87(24):241118.
U.S. Appl. No. 18/505,039, filed Nov. 8, 2023, Rothberg et al.
U.S. Appl. No. 18/500,999, filed Nov. 2, 2023, Rothberg et al.
U.S. Appl. No. 18/355,704, filed Jul. 20, 2023, Schmid et al.
Wahl et al., Dead-time optimized time-correlated photon counting instrument with synchronized, independent timing channels. Review of Scientific Instruments. Mar. 1, 2007;78(3).

* cited by examiner

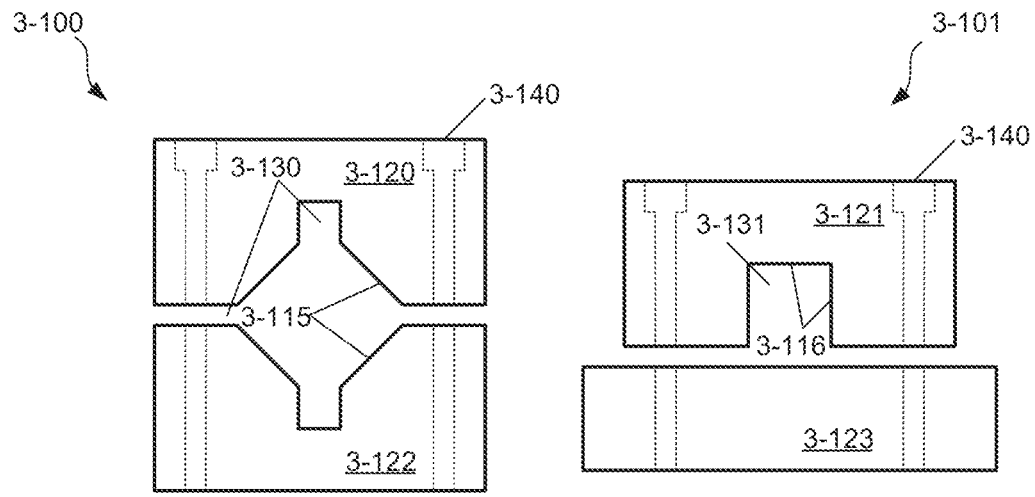
FIG. 3-1A
FIG. 3-1B
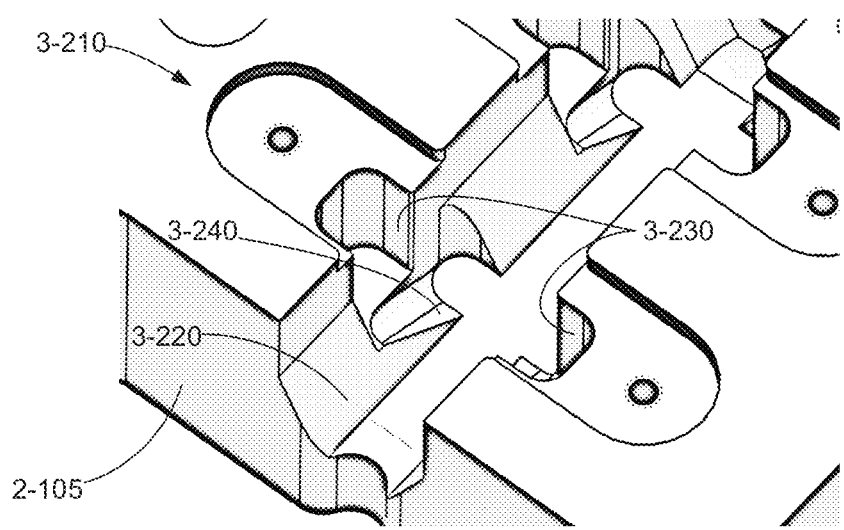
FIG. 3-2A

Pulse train modulation embodiments:

1) Past laser resonator output:

2) Internal to laser resonator:

3) Prior to laser resonator

AMPLITUDE-MODULATED LASER

RELATED APPLICATIONS

This application in a non-provisional application claiming the benefit under 35 USC 119(e) of U.S. Provisional Application Ser. No. 62/961,179, filed Jan. 14, 2020, entitled "AMPLITUDE-MODULATED LASER", the entire contents of which is herein incorporated by reference.

BACKGROUND

Field

The present application is directed to compact apparatus and methods for producing a train of sub-100-picosecond optical pulses of varying amplitude. The apparatus may be incorporated into instrumentation that uses the optical pulses for analytical, medical, manufacturing, or communication purposes.

Related Art

Ultrashort optical pulses (i.e., laser pulses less than about 100 picoseconds) are useful in various areas of research and development as well as commercial applications. For example, ultrashort optical pulses may be useful for fluorescent lifetime imaging (FLI) and lifetime-resolved fluorescent detection. Ultrashort pulses are useful in these applications because they can cause different materials to fluoresce, and this fluorescence can in turn be used to test for the presence of certain materials, which is useful in applications such as protein sequencing or genetic sequencing. For example, different fluorescent dyes will bond to different nucleotides. Thus, by using optical pulses to energize a dye that has bonded to a sample nucleotide and measuring the response, one can determine which dye is present in the sample and hence which nucleotide.

SUMMARY

The technology described herein relates to apparatus and methods for producing ultrashort optical pulses.

The ability to detect a given dye that has been excited by an optical pulse or optical pulses may depend on the total fluorescence from the dye over the detection period. Exciting a dye for longer periods may result in increased total fluorescence. However, the inventors have discovered and appreciated that, particularly when using the small amounts of dye involved in applications like protein or gene sequencing, exciting the dye for too long can be detrimental because this can cause the dye to decay ("bleach"). This bleaching effect can be alleviated by allowing the dye to return to a non-radiative state for some time. However, increasing the time between excitations reduces the rate at which detection operations can occur.

This invention uses a laser to create a laser pulse train that, when used to excite a fluorescent dye, increases total dye fluorescence while reducing dye decay. In certain embodiments, the laser is a mode-locked laser. The laser produces an amplitude-modulated pulse train. Using such an amplitude-modulated pulse train to excite a dye can cause the dye to fluoresce more brightly than it would if a continuous beam or constant-amplitude pulse train were used. Thus, a given overall amount of fluorescence can be concentrated in a shorter excitation period. This enables the invention to increase the amount of time during which the dye can recover in a non-radiative state while also maintaining or increasing total fluorescence.

In certain embodiments, a laser light source produces an amplitude modulated laser pulse train having ultrashort laser pulses. The pulse train may have a pulse duration of less than or equal to 100 picoseconds and individual pulses of varying amplitude. In certain embodiments, this invention uses a laser light source to produce an amplitude modulated pulse train having a pulse width of less than or equal to 100 picoseconds and individual pulses of varying amplitude.

The inventors have discovered and appreciated that the technique of modulating the amplitude of the laser pulse train may not achieve any of the above-described benefits when used with very small quantities of fluorescent dye, such as those used in applications like gene or protein sequencing, unless the parameters of the laser pulse train are specifically adjusted for use with small dye quantities. In certain embodiments, this invention addresses this issue by automatically configuring the laser parameters to optimize the fluorescence for specific dyes.

BRIEF DESCRIPTION OF DRAWINGS

FIG. 1-2 is a block diagram depiction of an analytical instrument that includes a compact mode-locked laser module, according to some embodiments.

FIG. 1-3 depicts an example of parallel reaction chambers that can be excited optically by a pulsed laser via one or more waveguides and corresponding detectors for each chamber, according to some embodiments.

FIG. 1-4 illustrates optical excitation of a reaction chamber from a waveguide, according to some embodiments.

FIG. 1-5 depicts further details of an integrated reaction chamber, optical waveguide, and time-binning photodetector, according to some embodiments.

FIG. 1-6 depicts an example of a biological reaction that can occur within a reaction chamber, according to some embodiments.

FIG. 1-7 depicts emission probability curves for two different fluorophores having different decay characteristics.

FIG. 2 is a high-level block diagram of an amplitude-modulated mode-locked laser according a non-limiting embodiment of the present application.

FIG. 2-1 depicts a compact amplitude-modulated mode-locked laser module, according to a non-limiting embodiment of the present application.

FIG. 3 illustrates a possible shape of a waveform produced from an amplitude-modulated pulse train according to a non-limiting embodiment of the present application.

FIG. 3-1A illustrates a mount for a gain medium or other high-power optical component which can be used in a compact mode-locked laser, according to a non-limiting embodiment of the present application.

FIG. 3-1B illustrates a mount for a gain medium or other high-power optical component which can be used in a compact mode-locked laser, according to a non-limiting embodiment of the present application.

FIG. 3-2A depicts an integrated optical mount, according to a non-limiting embodiment of the present application.

FIG. 3-2B depicts an optic mounted in an integrated optical mount, according to a non-limiting embodiment of the present application.

FIG. 3-3 depicts a saturable-absorber mirror and mount, according to a non-limiting embodiment of the present application.

FIG. 3-4 depicts an integrated optical mount, according to a non-limiting embodiment of the present application.

FIG. 4 illustrates experimental results showing increased fluorescence yield due to the use of an amplitude-modulated pulse train.

FIG. 5 illustrates possible shapes of a single period of an amplitude-modulated pulse train according to one or more non-limiting embodiments of the present application.

FIG. 5-1 depicts a system for synchronizing instrument electronics to timing of amplitude-modulated laser pulses, according to some embodiments.

FIG. 5-2 depicts clock-generation circuitry for an analytical instrument that incorporates a laser produced an AM laser pulse train, according to some embodiments.

FIG. 5-3 depicts system circuitry, according to some embodiments.

FIG. 6 is a high-level block diagram of an amplitude-modulated mode-locked laser according a non-limiting embodiment of the present application.

FIG. 7 is a high-level block diagram of an amplitude-modulated mode-locked laser according a non-limiting embodiment of the present application.

DETAILED DESCRIPTION

Using Amplitude Modulation to Increase Dye Fluorescence

A laser such as a mode-locked laser can be used to create a train of ultrashort (e.g., 100 picoseconds or less in duration) laser pulses. One example of a mode-locked laser that can produce ultrashort laser pulses is described in co-owned U.S. Pat. No. 10,283,928, entitled COMPACT MODE-LOCKED LASER MODULE, which is hereby incorporated by reference in its entirety.

One way in which ultrashort laser pulses can be used is to cause fluorescence in a dye. Certain materials are known to fluoresce when laser energy is applied to them. Directing a sequence of laser pulses onto a dye comprising such a material can cause the dye to fluoresce.

A single laser pulse may be described by multiple parameters, two of which are pulse amplitude and pulse duration (or pulse "width"). The pulse amplitude is the peak optical power the pulse reaches, while the pulse duration is the amount of time it takes for the power to go from the resting level up to the peak level and then back down to the resting level.

Figure 1:
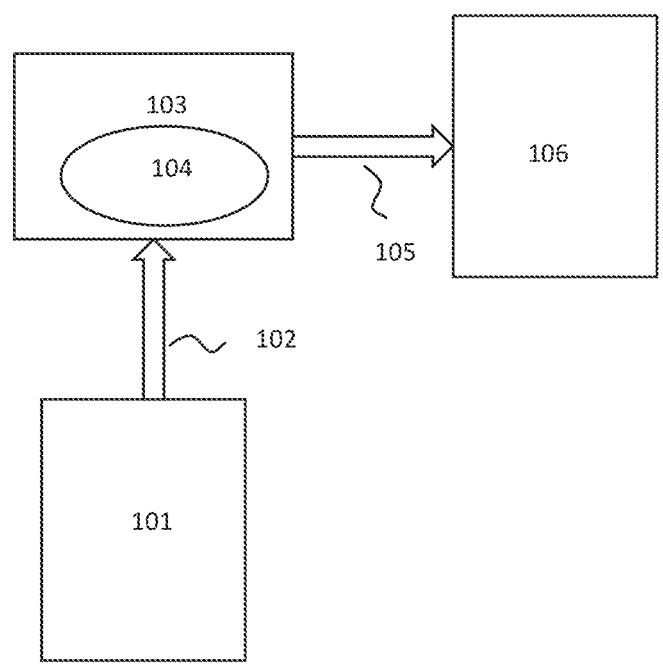
FIG. 1 is a high-level block diagram describing one use of an amplitude-modulated mode-locked laser according to a non-limiting embodiment of the present application.
Figures 1, 2:
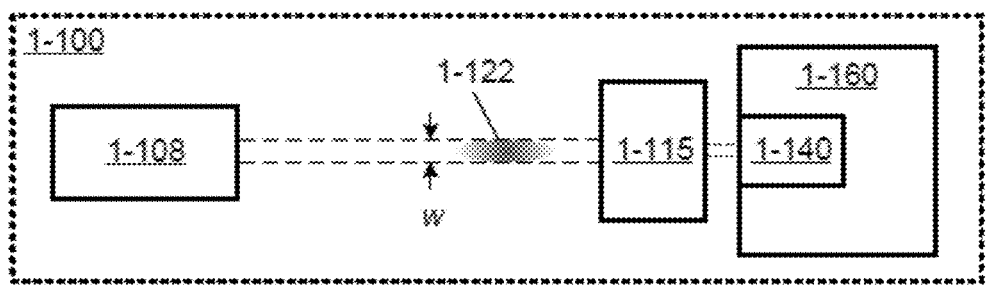
Figures 1, 2, 3:
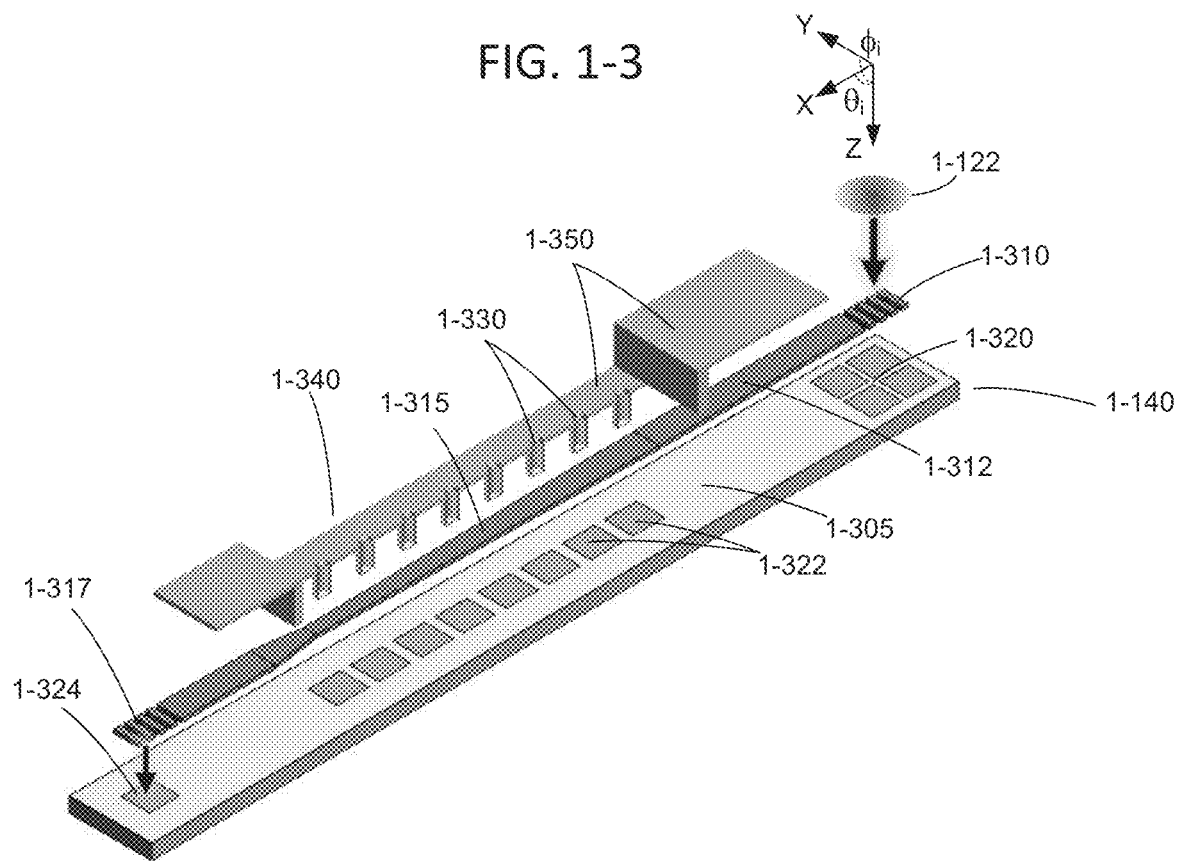

By adjusting the laser power between one pulse and the next, it is possible to use a laser such as a mode-locked laser to produce an amplitude-modulated ("AM") laser pulse train. A train of laser pulses may be grouped together in a waveform. This waveform can be made to take on different shapes by varying the pattern of the amplitude modulation of the individual pulses that make up the waveform. An example of such a waveform created from AM laser pulses is shown in FIG. 3. As can be seen in the figure, waveform 300 is made up of a series of individual ultrashort pulses 301 of varying amplitude. In the example of FIG. 3, the pulses produce a waveform of a sinusoidal shape, but other shapes can be produced using pulse trains, as discussed below.

Figures 1, 2, 3, 4:
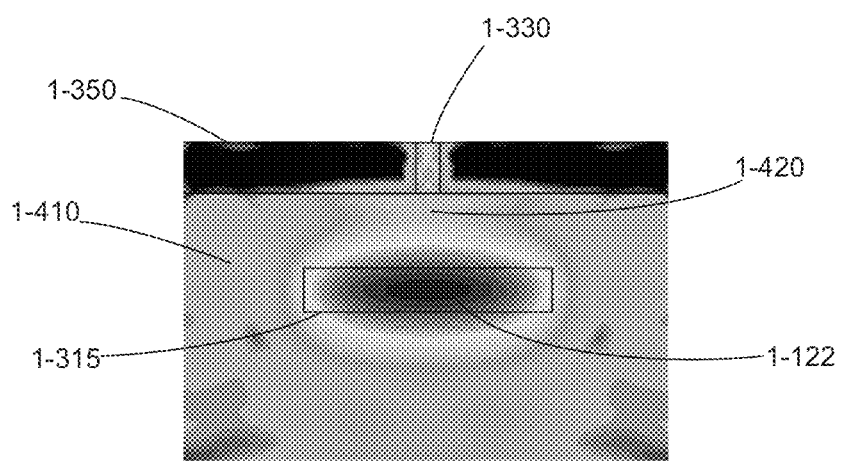

It has been demonstrated that the use of AM laser pulse trains can increase the fluorescence of dyes to which they are applied. For instance, FIG. 4 illustrates experimental data showing the fluorescence yield achieved using amplitude-modulated laser pulse trains and non-amplitude modulated laser pulse trains. As can be seen from the graph, the measured fluorescence yield when using an AM laser pulse train is higher than the measured yield when using a non-AM pulse train.

The use of amplitude modulation in the laser pulse train also helps increase the longevity of the dye. Being in a radiative state for too long a time may cause a fluorescent dye to decay—a phenomenon sometimes called "bleaching." This decay can be alleviated if the dye is allowed to spend time in a non-radiative state to recover after being excited. If an application requires a dye to be excited periodically, therefore, it is advantageous to allow the dye to spend as much time as possible in a non-radiative state between excitations. This goal can be achieved through the use of an AM laser pulse train. Because using such a pulse train increases dye fluorescence, the dye can produce a larger number of photons during a shorter excitation period, thus allowing the dye to spend more time in the non-radiative state before the next excitation.

The increase in fluorescence of a dye through the use of an AM laser pulse train has been observed experimentally for quantities of dye larger than those ordinarily used in applications such as gene or protein sequencing. In those applications, as discussed below, very small quantities of dye are often used because the goal of those applications is to be able to detect single molecules in a sample. The inventors have discovered and appreciated that, when applied to these very small quantities of dye, AM laser pulse trains created using pre-existing techniques do not increase dye fluorescence, and in some cases may decrease fluorescence. The inventors have further discovered and appreciated that in order to achieve the benefits of AM laser pulse trains when using the small dye quantities suitable for single-molecule applications, the parameters of the laser pulse train must be carefully adjusted. The parameters that need to be adjusted may include peak pulse amplitude, waveform/modulation shape (e.g. sinusoid, square, triangle, or arbitrary shape), waveform/modulation duty cycle, pulse width, repetition rate of pulses in the laser pulse train, pulse duty cycle, laser wavelength, and photon energy of the light emitted by the laser. An exemplary system that can adjust these parameters to produce AM laser pulse trains suitable for single-molecule applications is described below.

Exemplary Implementation of Amplitude-Modulated Laser

The systems and methods described in this application for generating AM laser pulse trains may be used as part of an application that involves using lasers to identify a fluorescent material. The basic concept of using a laser to identify a fluorescent material is illustrated in FIG. 1. Laser module 101 produces laser light 102, which is directed at fluorescent material 104 contained in container 103. In some instances, this container may be referred to as a "reaction chamber." The laser light causes material 104 to fluoresce, which produces light 105 that can be detected by detector 106. As discussed in more detail below, by analyzing the characteristics of the light detected by the detector, it is possible to identify the fluorescent material 104 contained in reaction chamber 103.

One of ordinary skill will appreciate that this basic concept can be implemented with various types of lasers 101. In addition, although FIG. 1 illustrates only one laser, reaction chamber, and detector, one of ordinary skill will understand and appreciate that this fluorescence detection scheme can be implemented with one or more lasers, reaction chambers, and detectors, and that these components could be separate components or integrated into devices that combine two or more of these components. In addition, one of ordinary skill will understand and appreciate that a system for detecting fluorescence may include other components not shown in FIG. 1, such as a computer that can analyze the output of detector 106.

As discussed above, the fluorescence of material 104 can be improved by exciting it with an AM laser pulse train. FIG. 2 is a block diagram illustrating the basic configuration of a laser module that can produce an AM laser pulse train according to aspects of the present invention. The laser module shown in FIG. 2 is a non-limiting example of an implementation of the laser module 101 shown in FIG. 1. Laser 200 comprises a laser diode 201 driven by a current source 202. The diode produces pumping energy 203 that excites the gain medium 205 inside the laser cavity 204. The laser outputs a pulse train 206. Control signal 207 controls the current of the current source. And individual laser pulse is produced by causing the current source to vary its current from some baseline up to some peak and then back down to the baseline. By varying the peak current output of the current source from pulse to pulse, an AM laser pulse train can be produced.

Figures 1, 2, 3, 4, 5:
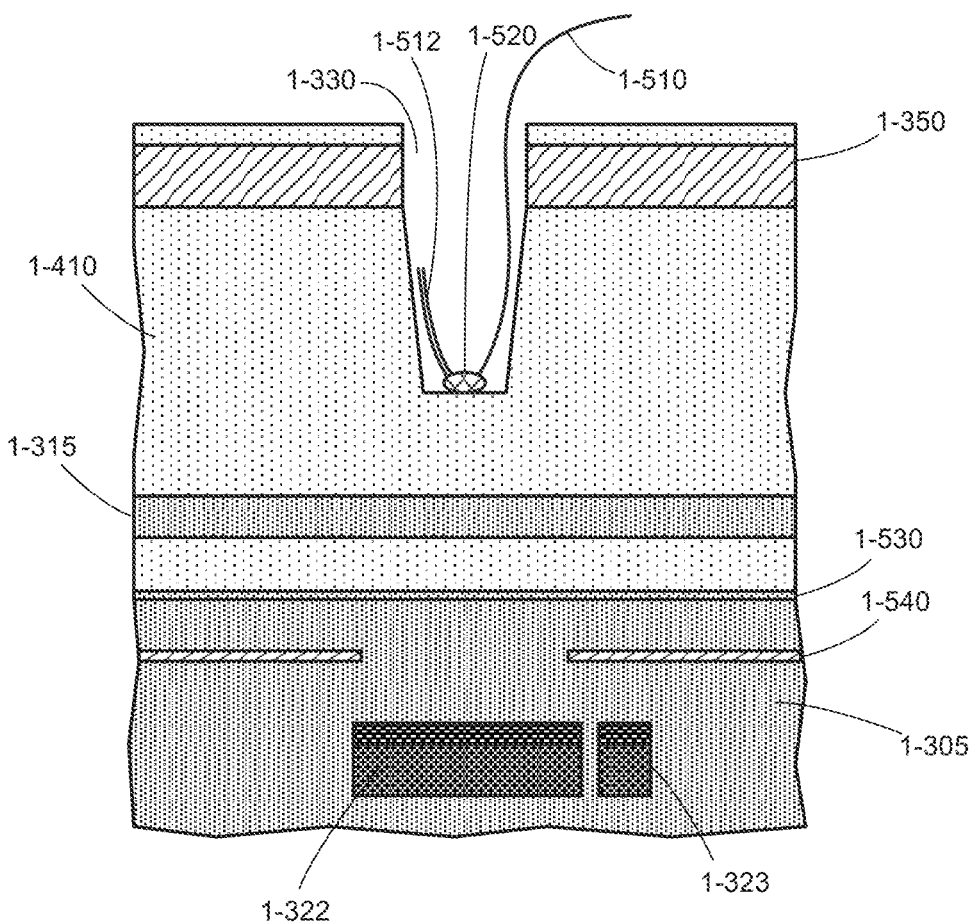

As discussed above, a waveform made up of AM laser pulses can take on various shapes. One such shape is the sinusoidal shape illustrated in FIG. 3. As shown in FIG. 5, however, other waveform shapes can also be used, including a square wave (501) and a triangle wave (502). In the exemplary laser module of FIG. 2, the waveform shape is governed by the pattern of the control signal 207 sent to the current source 202. For example, to produce a square wave, the control signal 207 may cause the current source 202 to produce the same peak output current in every pulse. To produce a triangle wave, the control signal may cause the current source to progressively increase the peak output current in a linear pattern up to some maximum value for the waveform, then cause the current source to progressively decrease the peak output current in linear fashion until the last pulse of the waveform. Similarly, to produce a sinusoidal waveform, the control signal may increase and then decrease the peak current from pulse to pulse according to a sinusoidal pattern. In addition, the waveform need not have a fixed shape, but could instead be formed of arbitrary pulses with varying rise times, fall times, and duty cycles.

In the exemplary laser module implementation shown in FIG. 2, amplitude modulation is achieved by varying the peak current produced by the current source powering the laser diode. However, other techniques may be used to achieve amplitude modulation.

Figures 1, 2, 3, 4, 5, 6:
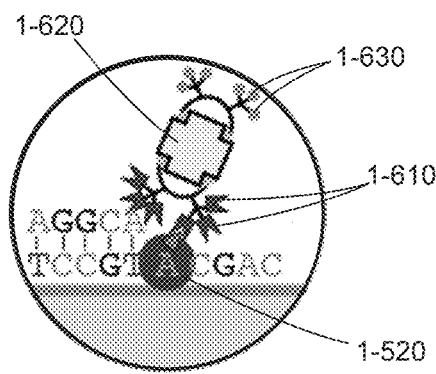

One set of these alternate techniques is illustrated in FIG. 6. In FIG. 6, Laser 600 comprises a laser diode 601 driven by a current source 602. The diode produces pumping energy 603 that excites the gain medium 605 inside the laser cavity 604. The laser outputs laser light 606. Control signal 607 controls the current of the current source. Unlike the example in FIG. 2, however, in FIG. 6, the control signal is not used to achieve amplitude modulation. Instead, a component 608 operates on the laser light 606 output from the laser cavity and produces the amplitude-modulated pulse train 609. This component may be an acousto-optic modulator, an electro-optic modulator, a mechanical chopper, or a pulse picker.

Figures 1, 2, 3, 4, 5, 6, 7:
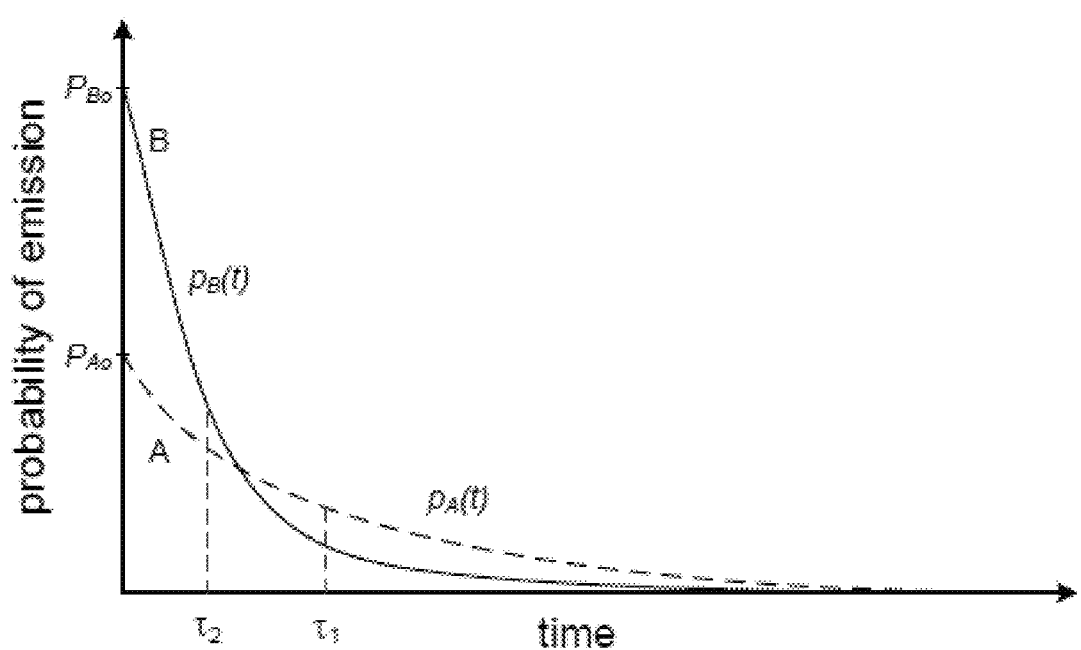
Figure 2:
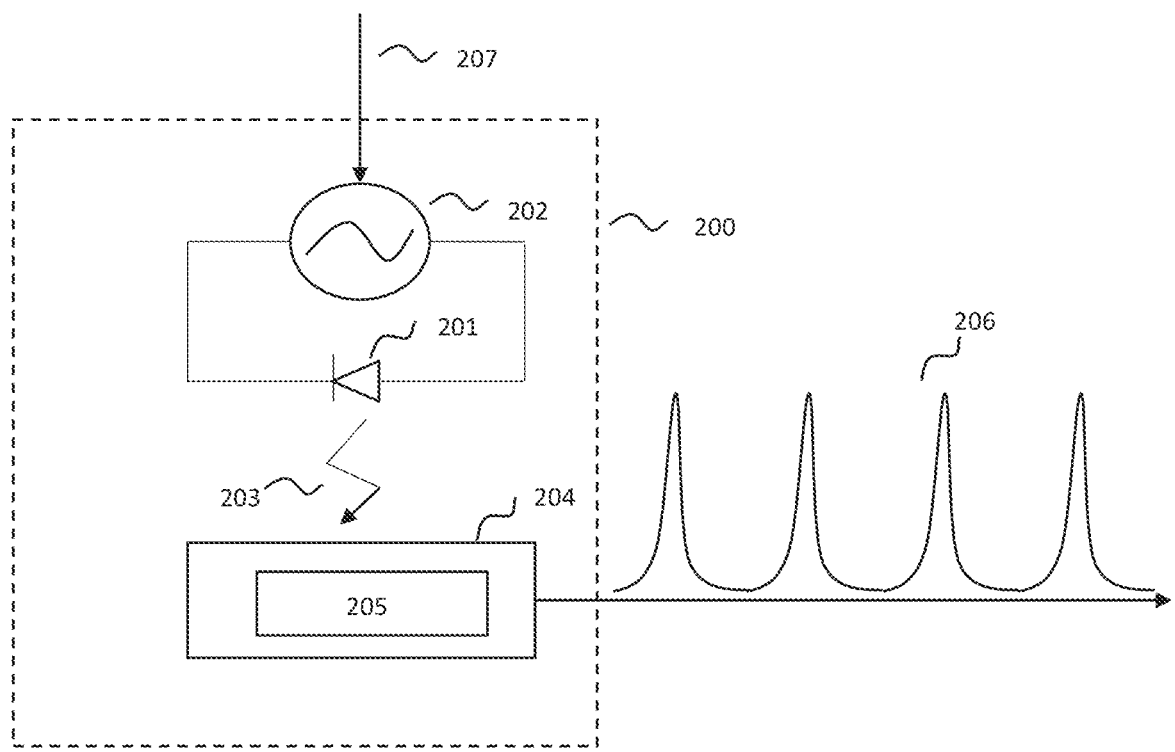
Figures 1, 2:
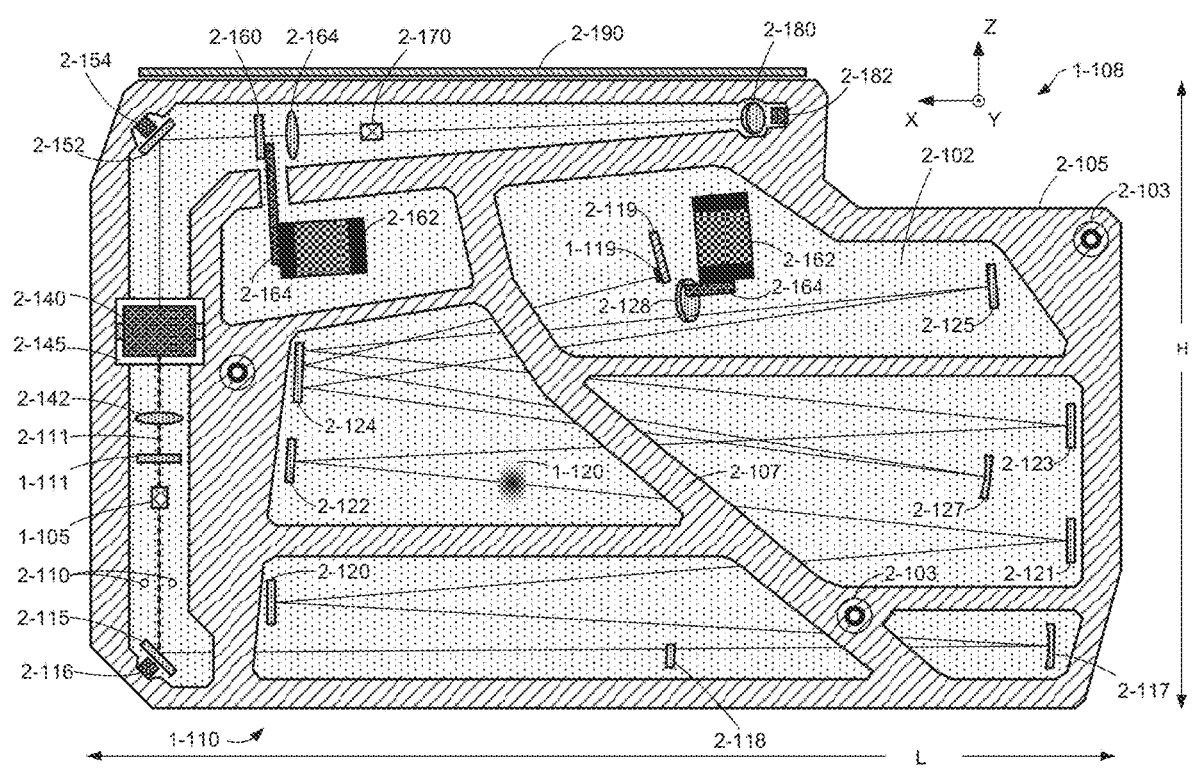

Another set of alternative techniques to achieve laser modulation is illustrated in FIG. 7. In FIG. 7, Laser 700 comprises a laser diode 701 driven by a current source 702. The diode produces pumping energy 703 that excites the gain medium 705 inside the laser cavity 704. Control signal 707 controls the current of the current source. Unlike the example in FIG. 2, however, in FIG. 7, the control signal is not used to achieve amplitude modulation. Instead, a component 708 operates on the laser light 706 produced by the gain medium 705 and produces the amplitude-modulated pulse train 709. This component may be an acousto-optic modulator, an electro-optic modulator, a mechanical chopper, or a pulse picker.

Figure 8:
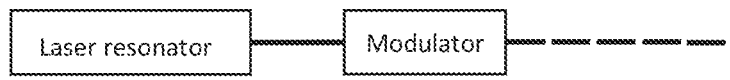
FIG. 8 is a high-level block diagram illustrating the options for arranging the modulator relative to the laser.
Figure 8:
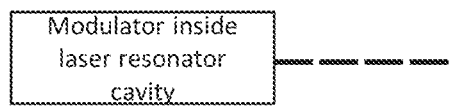
Figure 8:
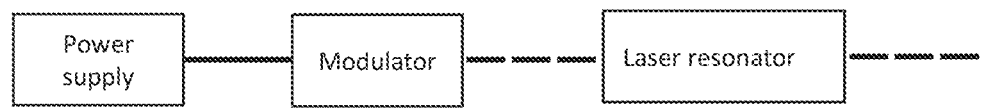

It should be understood that the invention is not limited to the specific modulation techniques shown in and discussed with respect to FIGS. 2, 6, and 7; other techniques can also be used. Laser modulation can generally be achieved by three broad categories of implementations, as shown in FIG. 8: by placing a modulator on the output of the laser resonator, placing the modulator inside the resonator, or placing the modulator such that it modulates the power supplied to the resonator. All three of these techniques may be used with the present invention.

Compact Mode-Locked Laser Module

The inventors have conceived and built a compact mode-locked laser module that produces the above-described AM laser pulse train.

In overview and referring to FIG. 2-1, principle components of a compact mode-locked laser module 1-108, according to some embodiments, can include a laser cavity (which includes optical elements between an output coupler 1-111 that can function as a first end mirror of the laser cavity and saturable absorber mirror (SAM) 1-119 that can function as a second end mirror of the laser cavity), a formed base chassis 2-105 on which some or all of the components of the mode-locked laser 1-110 are mounted, at least one intracavity optical element 2-128 that can stabilize operation of the mode-locked laser, frequency-doubling elements 2-170, 2-164, 2-160 that can participate in converting an output from the laser to a shorter wavelength, and electrical components 2-190, 2-154, 2-182, 2-116 that monitor operational parameters of the laser and generate an electronic clock signal that is synchronized to the optical pulses produced by the laser. A pump module 2-140 can be mounted to the base chassis 2-105 and used to excite the gain medium 1-105 of the mode-locked laser. This pump module comprises a laser diode powered by a variable current source, and variation in the current produced by the current source produces modulation in the amplitude of the laser.

Base Chassis and Laser Cavity

The base chassis 2-105 of a compact mode-locked laser module 1-108 may measure between about 20 cm and about 30 cm in length L, between about 10 cm and about 20 cm in height H, and has a thickness between about 10 mm and about 30 mm, according to some embodiments. In some cases, one or more of the dimensions can be up to 20% larger. According to some embodiments, a volume occupied by the compact, mode-locked laser module 1-108 can be about 30 cm×18 cm×3 cm or approximately 0.07 ft3. According to some implementations, the overall shape or form factor of the mode-locked laser module 1-108 is a slab having a length L longer than a height H and a thickness much less than either the length or height, occupying a volume less than 0.1 cubic foot and weighing less than, or has a weight of, approximately, 2 kilograms. In some cases, the weight of the module 1-108 is between 1 kilogram and 2 kilograms.

In some embodiments, the base chassis 2-105 can be formed from aluminum, titanium, an alloy of aluminum, or an alloy of titanium. Other materials can be used in other embodiments. In some implementations, the base chassis 2-105 can include a plurality of cavities 2-102 that are machined or otherwise formed (e.g., by casting or assembly) into the base chassis. In some embodiments, 12.5 mm-diameter optical components (or smaller) can be used to construct the mode-locked laser 1-110 and be partially or fully recessed into the cavities 2-102 of the base chassis 2-105, so that a cover (not shown) can be placed over the cavities 2-102 to protect the components within the cavities from outside environmental factors and contaminants. In some embodiments, a cover can be placed over the cavities 2-102 to hermetically seal one or more of the cavities.

Between the cavities 2-102, there can be ribs 2-107 formed in the base chassis 2-105. In some of the ribs, there can be holes or openings (not visible) that allow the intracavity laser beam to pass through the ribs to adjacent cavities. According to some embodiments, there can be one or more diagonal ribs 2-107 that runs at an angle with respect to an edge of the base chassis 2-105. For example, a diagonal rib 2-107 can run in a corner-to-corner direction across the base chassis 2-105. The inventors have found that such a diagonal rib 2-107 can increase the torsional stiffness of the base chassis 2-105 by a factor of three compared to having no diagonal ribs. An increased torsional stiffness can help prevent instability of laser operation and improve the module's resistance to perturbing forces acting on the base chassis 2-105. In some cases, at least portions of the ribs can extend from a bottom of a cavity to a top surface of the base chassis 2-105, so that one or more covers (not shown) for the laser module 1-108 can attach to the ribs. In this regard, any suitable cover may be used including, but not limited to, a stiff metal cover (e.g., a metal having a thickness greater than approximately 1 mm), a stiff polymer cover (e.g., a polymer having a thickness greater than approximately 2 mm), or a flexible material (metal or polymer) that can be sealed to the base chassis 2-105, or held against the base chassis 2-105 with a supporting piece (e.g., a metal frame). In some cases, a covering material comprises Tyvek® (approximately 0.25 mm thick) that is held against the base chassis with a metal frame (approximately 1.5 mm thick).

In some implementations, one or more mounting features 2-103 can be located at one or more ribs 2-107. The mounting features 2-103 can be used to mount the compact laser module 1-108 to an instrument or other platform. In some cases, the mounting features provide kinematic mounting, so that each laser module 1-108, or the same laser module, reproducibly mounts in nearly the same location and alignment (e.g., to within +100 microns). The mounting features 2-103 may comprise holes that are tapped or are clear. The holes can be countersunk or counterbored. For kinematic mounting, there can be three mounting features 2-103 for which the bottom surfaces (not shown in FIG. 2-1) comprise a conical contacting surface or ring contact for a first mounting feature, a wedged contacting surface or two-point contacting surface for a second mounting feature, and a flat surface or single-point contact for a third mounting feature. Alternatively, two countersunk holes at the mounting features 2-103 may be used to align the base chassis 2-105 to a receiving support structure.

A mode-locked laser 1-110 of the laser module 1-108 can comprise an output coupler 1-111 at an output end of the laser's cavity, a gain medium 1-105, and a saturable absorber mirror (SAM) 1-119 at an opposite end of the laser cavity. There can be multiple mirrors 2-116, 2-117, 2-120, 2-121, 2-122, 2-123, 2-124, 2-125 within the laser cavity to fold the optical axis 1-125 of the laser and extend the length of the laser cavity to achieve a desired pulse repetition rate or pulse separation interval T. There can also be beam-shaping optics (e.g. lenses and/or curved mirrors) within the laser cavity to alter a size and/or shape of the intracavity laser beam.

Example optical components for a mode-locked laser that operates at a lasing wavelength of 1064 nm will now be described. It will be appreciated that embodiments of invention are not limited to only the described optical components. Fewer or more optical components may be used in some implementations (e.g., adding or removing mirrors to change the pulse repetition rate), and the optical coatings on components can be different for lasers that lase at different wavelengths.

The gain medium 1-105 can comprise a neodymium-doped material that is mounted in a thermally-conductive mount (e.g., an aluminum or copper block or other thermally-conductive material) which dissipates heat into the base chassis 2-105. The inventors have recognized that when the mode-locked laser operates at high average powers (e.g., over 300 mW) thermal lensing effects in the gain medium 1-105 occur. In some cases, such thermal lensing could destabilize operation of the laser. To improve heat transfer from the gain medium to the thermally-conductive mount, the gain medium 1-105 can be wrapped in indium foil or any other suitable material that improves heat transfer to the thermally-conductive mount. In some cases, silver epoxy or any other suitable thermally-conductive adhesive can be used to secure the gain crystal to the thermal mount. In some cases, the gain medium 1-105 and thermally-conductive mount can be mounted on a thermo-electric cooler (TEC), which can sink heat into the base chassis 2-105. The TEC or other active cooling techniques such as liquid cooling can provide active temperature control of the gain medium 1-105 and reduce thermal lensing effects.

Surprisingly, the inventors found that a laser cavity configuration, for which analytic modeling showed an unstable resonator, could lase stably in the laboratory. To explain the lasing, the model had to be changed to include an amount of thermal lensing in the gain medium greater than about one diopter. According to some embodiments, a laser cavity configuration could be obtained in which large amounts of thermal lensing could be tolerated. As a result, active cooling of the gain medium can be removed from the mode-locked laser module 1-110. In embodiments, the gain medium 1-105 can be disposed in a thermally-conductive mount that contacts the base chassis so as to conduct heat passively from the gain medium 1-105 to the base chassis 2-105.

Elimination of active cooling of the gain medium 1-105 can reduce cost and complexity of the laser. The inventors have observed that active temperature control of the gain medium need not be used for the mode-locked laser 1-110 of the present embodiments, even when optical pumping powers of up to 10 Watts are used to pump the gain medium. Surprisingly, the mode-locked laser 1-110 remains stably mode locked over this range of pump power, even though the associated thermal lensing effects (positive lensing) can change a thermally-induced focal length of the gain medium from 0 to approximately 15 diopters over the pump power range. For thermal lensing in excess of 15 diopters, the laser cavity can become an unstable resonator that may not support mode-locked operation nor continuous-wave operation. The stability of mode locking over such a large range of thermal lensing in the gain medium is due in part to the selection and arrangement of optical components for the mode-locked laser 1-110. According to one embodiment, stability and improved performance of mode-locked operation depends critically on having an amount of thermal lensing occur in the gain medium. In embodiments, stable mode-locked operation of the mode-locked laser 1-110 can be obtained for an amount of thermal lensing between one diopter and 15 diopters of positive lensing effect. Even though the thermal lensing may vary over this range, no mechanical adjustments need be made to the laser cavity to maintain stable mode locking. Improved performance of the mode-locked laser can be obtained when the amount of thermal lensing in the gain medium 1-105 is between 8 diopters and 12 diopters of positive thermal lensing. For continuous-wave operation, there can be between 0 diopter and at least 15 diopters of positive thermal lensing. An amount of thermal lensing (greater than approximately 4 diopters) can be measured by passing a continuous wave laser probe beam (e.g., from a helium neon laser or laser diode) through the gain medium 1-105 (e.g., at an angle) and measuring a relative displacement of the probe beam at a distance from the gain medium between "pump-beam-on" and "pump-beam-off" states. A pump-beam-on state is when the laser diode pump beam is on and exciting the gain medium 1-105 for mode-locked lasing of the laser 1-110. Values below 4 diopters can be difficult to measure accurately, since the relative displacement becomes small.

Absorption of an optical pump beam in the gain medium 1-105 can cause thermal lensing in the gain medium. In embodiments, an amount of thermal lensing in the gain medium can be changed by changing an amount of power in an optical pump beam applied to the gain medium 1-105 (e.g., changing an amount of power from pump module 2-140). Additionally or alternatively, an amount of thermal lensing in the gain medium can be changed by tuning an optical wavelength of an optical pump beam used to excite the gain medium 1-105. Tuning of the optical pump beam's wavelength can be performed, for example, by tuning a temperature of a laser diode in the pump module 2-140. Tuning a pump beam's wavelength can change an amount of absorption of the optical pump beam in the gain medium 1-105.

In some implementations, the gain medium 1-105 can comprise neodymium vanadate (e.g., Nd3+:YVO4), which can provide lasing at 1064 nm. Other solid state crystals such as, but not limited to, Nd: YAG, Nd: YLF, and Cr: Forsterite can be used in other embodiments. In some implementations, a neodymium vanadate gain medium 1-105 can be used to provide lasing at 1342 nm alternatively or additionally, provided optical components in the cavity are designed and coated for lasing at this wavelength. The gain medium can have a length between 3 mm and 11 mm, in some cases. In some embodiments, the length of the gain medium can be between 5 mm and 9 mm. The neodymium dopant level (atomic %) can be between 0.10% and 1%, in some cases. In some implementations, the dopant level can be between 0.10% and 0.50%. In some implementations, the dopant level can be between 0.24% and 0.30%. According to some embodiments, the crystal length can be approximately 7 mm and the dopant level can be approximately 0.27%. The inventors have found that doping levels (atomic %) appreciably higher than 0.3% for lengths of approximately 7 mm can destabilize operation of the laser at higher operating powers (e.g., induce lasing in higher-order spatial modes, or destabilize or terminate mode locking), which may undesirably require readjusting intracavity components. For example, with 1% doping, mode locking terminated above a certain pump power level, and intracavity optical elements had to be readjusted to regain mode locking. The transverse dimension or dimensions of the gain medium 1-105 can be any suitable value (e.g., between 1 mm and 4 mm). The gain medium can be in the form of a cylindrical rod, rectangular bar, or any other shape.

End facets of the gain medium 1-105 can be anti-reflection coated for the lasing wavelength $\lambda_l$ (which can be about 1064 nm for neodymium vanadate) and for the pump wavelength $\lambda_p$ (which can be about 808 nm for neodymium vanadate), according to some embodiments. In some embodiments, one end facet of the gain medium can be coated with an output coupler coating, so that the end facet acts as an end mirror of the laser cavity and a separate output coupler 1-111 need not be used.

The gain medium 1-105 can be mounted in a non-adjustable mount (i.e., a mount that provides no fine angular or positional adjustment) in an orientation where end facets of the gain medium have normal vectors oriented at an angle between about 1 degree and about 3 degrees to the optical axis 1-125 of the laser cavity. For example, a thermally-conductive mount for the gain medium can include a recess in which the gain medium 1-105 is placed. The recess can align the gain medium to the thermally-conductive mount. The thermally-conductive mount can then register to features on the base chassis 2-105 (e.g., any one or combination of machined surfaces, pins, screw holes) to align the gain medium at an angle to the optical axis 1-125 of the laser cavity. According to some implementations, the gain medium 1-105 can be cut and oriented in its mount so that it aligns with a favored polarization intended for lasing. For example, the gain medium 1-105 can be oriented to lase with a linear polarization parallel to the Y axis in FIG. 2-1.

An example of a thermally-conductive mount 3-100 for the gain medium is depicted in FIG. 3-1A, according to some embodiments. The depicted mount 3-100 is designed for a gain medium having a square cross section, but the mount 3-100 can be designed for other cross-sections such as rectangular, round, oval, or polygonal. According to some embodiments, a thermally-conductive mount 3-100 for a gain medium can comprise a first portion 3-120 and a second portion 3-122 that are configured to be joined together in a clamping arrangement. For example the first portion 3-120 and second portion 3-122 can contain through-holes 3-140 for screws (not shown) that allow the two portions to be fastened to and placed in thermal contact with the base chassis 2-105. Screws placed in the through-holes 3-140 can align the mount 3-100 to the base chassis 2-105 and clamp the gain medium 1-105. The first portion 3-120 and the second portion 3-122 can be formed from a high-thermal-conducting material such as copper or aluminum, although other materials can be used in other embodiments. The first and second portions can have interior faces 3-115 that are arranged to be placed in thermal contact with the gain medium 1-105. According to some embodiments, there can be trenches or openings 3-130 located at regions of the mount where corners of the gain medium 1-105 may be located (e.g., when the gain medium 1-105 is mounted in the mounting structure 3-100). The trenches or openings can extend between about 0.5 mm and about 3 mm on either side of a corner location of the gain medium 1-105. The inventors have found that the openings at the corners in the mount 3-100 for the gain medium 1-105 can alleviate thermal and mechanical stress that may otherwise crack the gain medium 1-105 and/or adversely affect the optical mode profile of the laser.

Another example of a thermally-conductive mount 3-101 for the gain medium 1-105 is depicted in FIG. 3-1B. The mount 3-101 can include a first portion 3-121 and a second portion 2-123. The first portion 3-121 can include a recess 3-131 machined into the first portion that is slightly oversized compared to the gain medium 1-105 (not shown). In some implementations, a gain medium (e.g., neodymium-vanadate crystal) can be adhered into the recess 3-131 to interior surfaces 3-116 of the recess with a thermally-conductive adhesive or gel. The oversized recess 3-131 can accommodate a thin layer (e.g., less than 400 microns thick) of adhesive or gel that can avoid mechanical stresses from the mount 3-101 that would act on the gain medium 1-105. The gain medium can also be adhered to a surface of the second portion 3-123 when secured in the laser cavity 1-110. In some embodiments, the second portion 3-123 can be formed in the base chassis 2-105 (e.g., a platform or other supporting structure machined into the base chassis 2-105). The first portion 3-121 can be connected to the second portion 3-123 with screws, for example.

According to some embodiments, an output coupler 1-111 for a compact mode-locked laser can be a high-quality laser optic having a surface quality of 10-5 (scratch and dig) and a wavefront error of at most $\lambda/10$. One surface of the output coupler 1-111 can be coated with a multi-layer dielectric to provide a reflectivity having a value between about 75% and about 95% for the lasing wavelength $\lambda_l$ and allow (with minimal reflectance) transmission of a pump wavelength $\lambda_p$ that is used to excite the gain medium 1-105. In some embodiments, the lasing wavelength may be about 1064 nm and the pump wavelength may be about 808 nm, though other wavelengths can be used in other embodiments. In some implementations, the reflectivity of the output coupler at the lasing wavelength is between 82% and 88%. The inventors have discovered that an output coupler within this range of reflectivity provides a desired amount of output power with stable operation of the laser and provides appropriate amounts of fluence on the saturable absorber mirror 1-119 over an operating range of the laser.

A second surface of the output coupler 1-111 (toward the laser output) can be coated with an antireflection coating for both the pump wavelength and lasing wavelength, and can be oriented at an angle (e.g., between about 1 degree and about 4 degrees) with respect to the reflective surface of the output coupler. The inventors have found that a small amount of reflection of the lasing wavelength from the output (transmitting) surface of the output coupler 1-111 can appreciably and adversely broaden pulses from the mode-locked laser. According to some embodiments, the coatings on the output coupler are dichroic, so as to transmit with negligible reflection the pump wavelength $\lambda_p$.

According to some embodiments, the output coupler 1-111 can be mounted in a two-axis adjustable mount that provides angular adjustment with respect to the optical axis 1-125 about two orthogonal axes (e.g., about the Y and X axes in FIG. 2-1). In some embodiments, the output coupler 1-111 can be mounted in a non-adjustable mount which can be integrated into the base chassis 2-105. A non-adjustable mount reduces cost and complexity of the compact laser. In yet other embodiments, the output coupler 1-111 can be formed as a multilayer optical coating on an end-face of the gain medium 1-105 instead of a separate optical component comprising a transparent substrate and one or more optical coatings.

Figure 3:
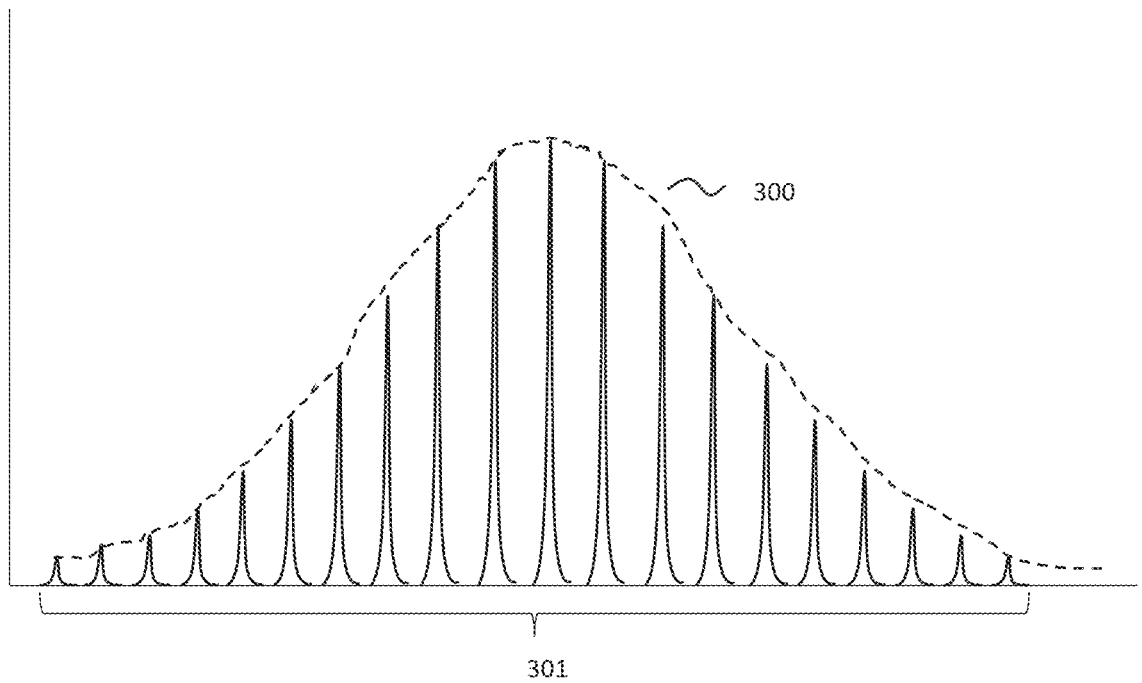
Figures 2B, 3:
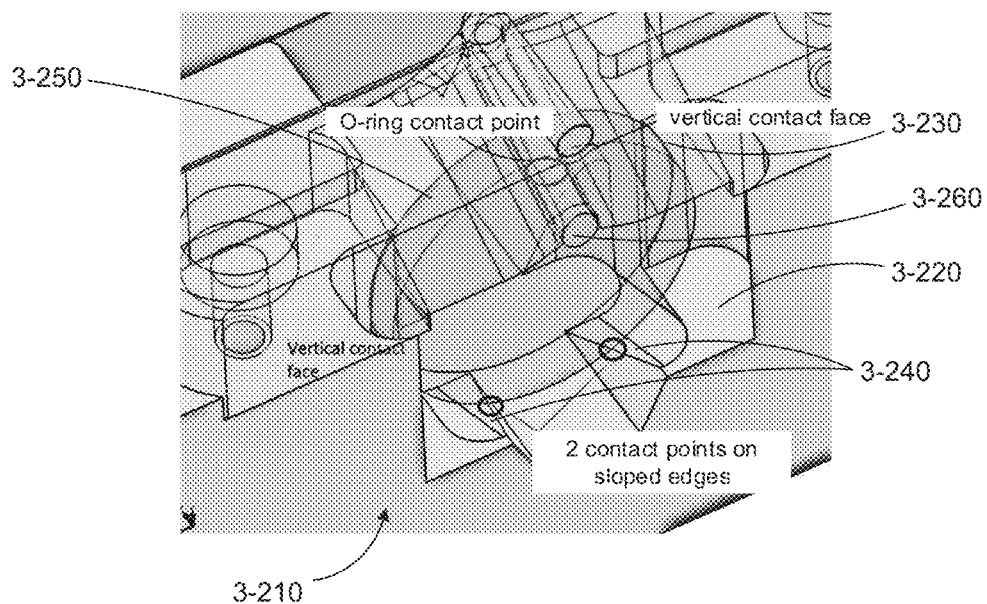
Figure 3:
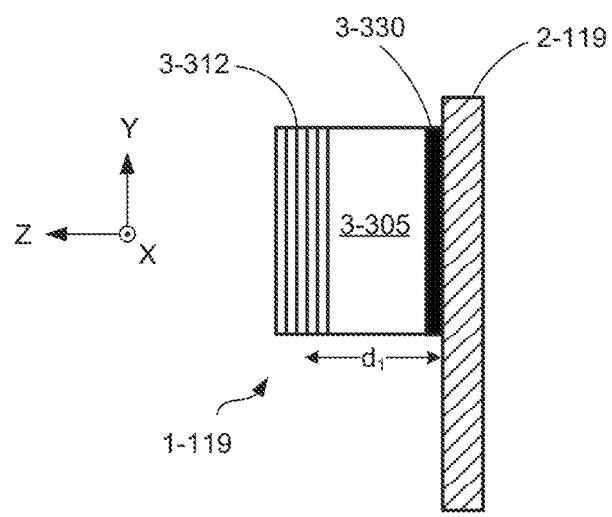
Figures 3, 4:
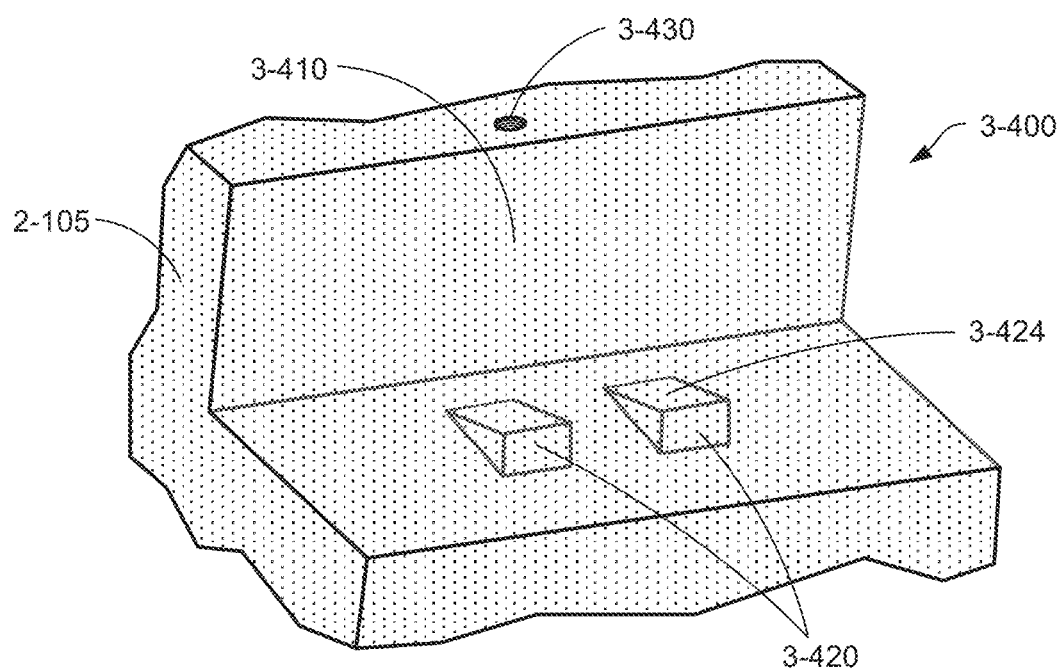
Figure 4:
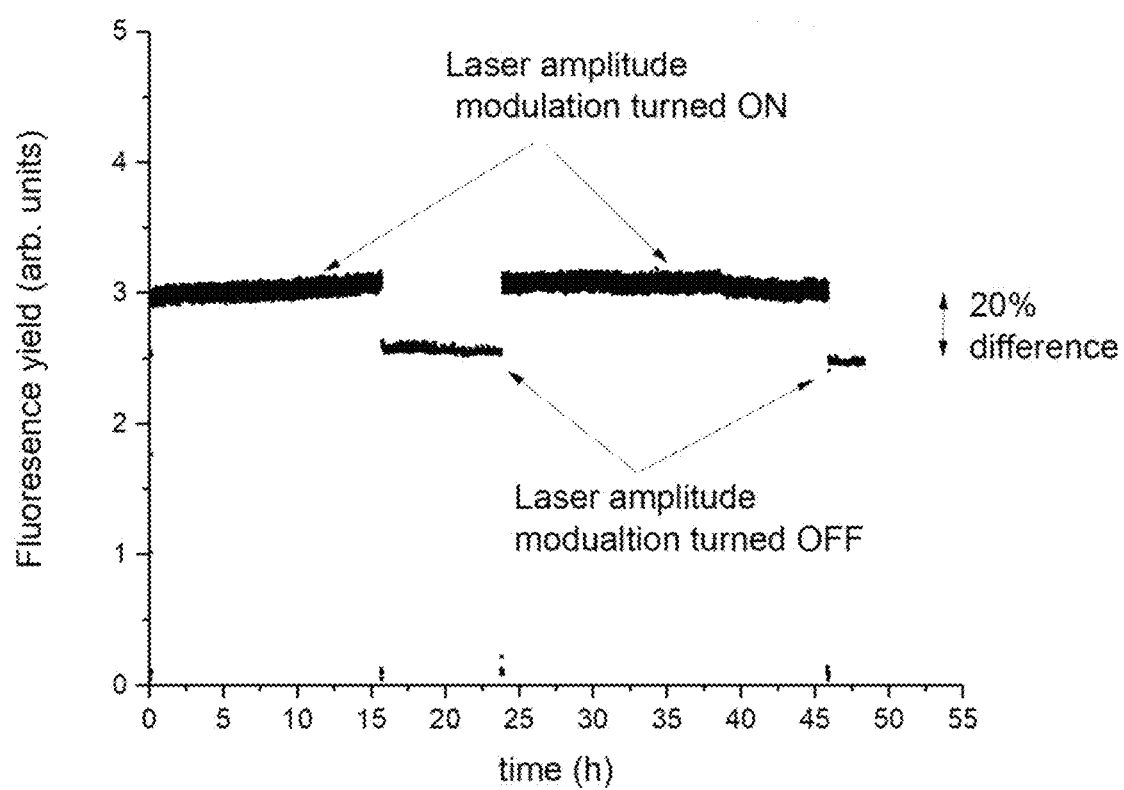
Figure 5:
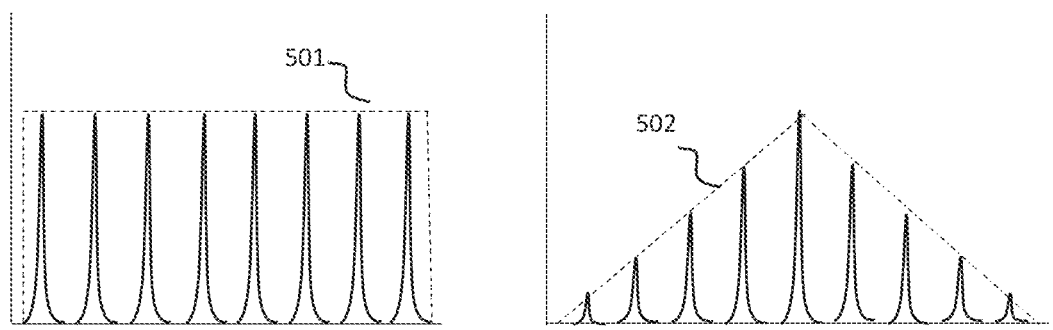
Figures 1, 5:
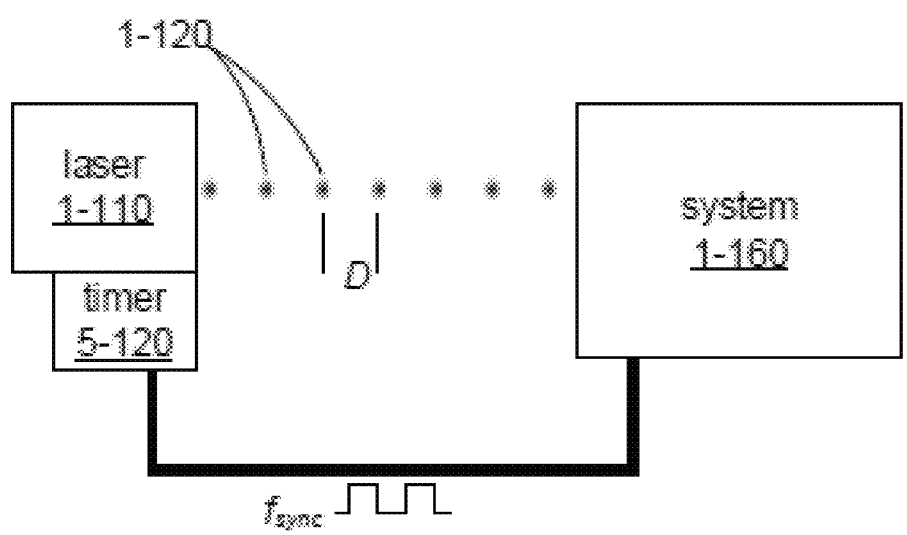
Figure 5:
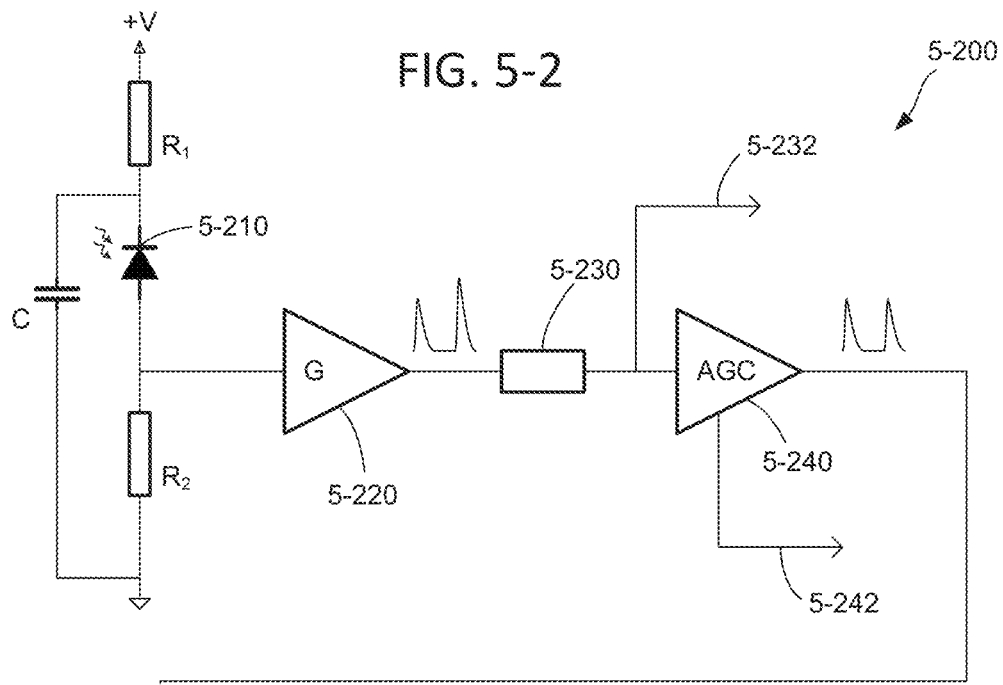
Figure 2:
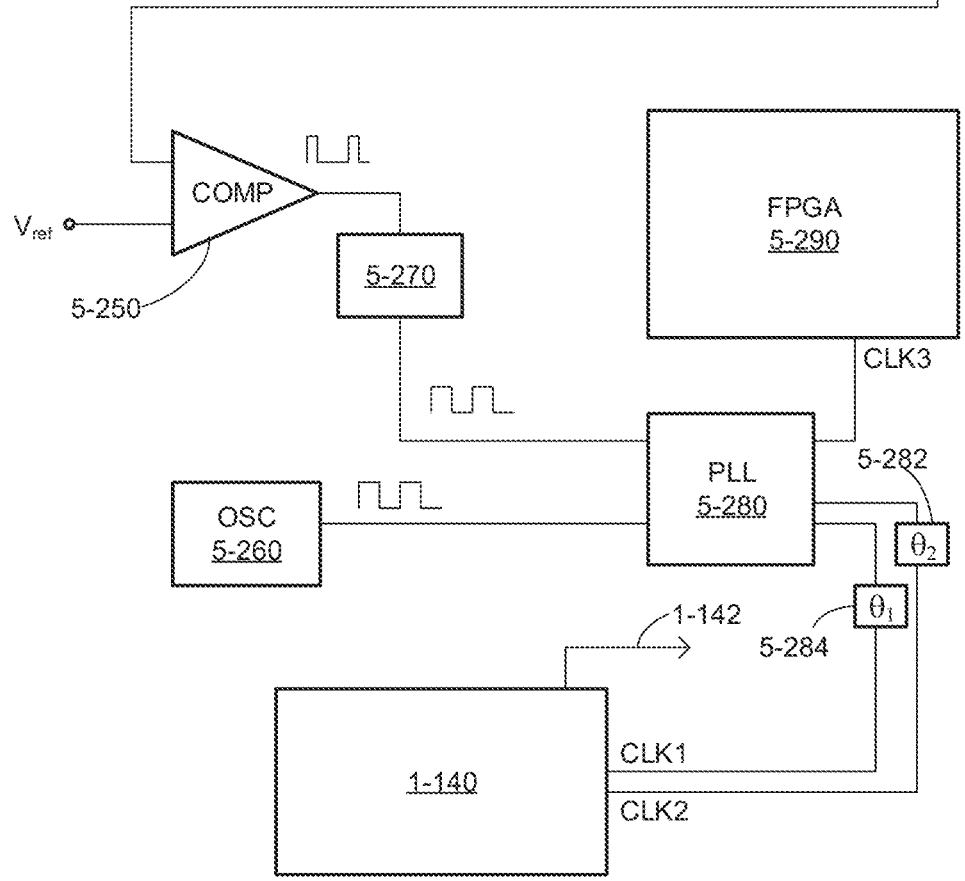
Figures 3, 5:
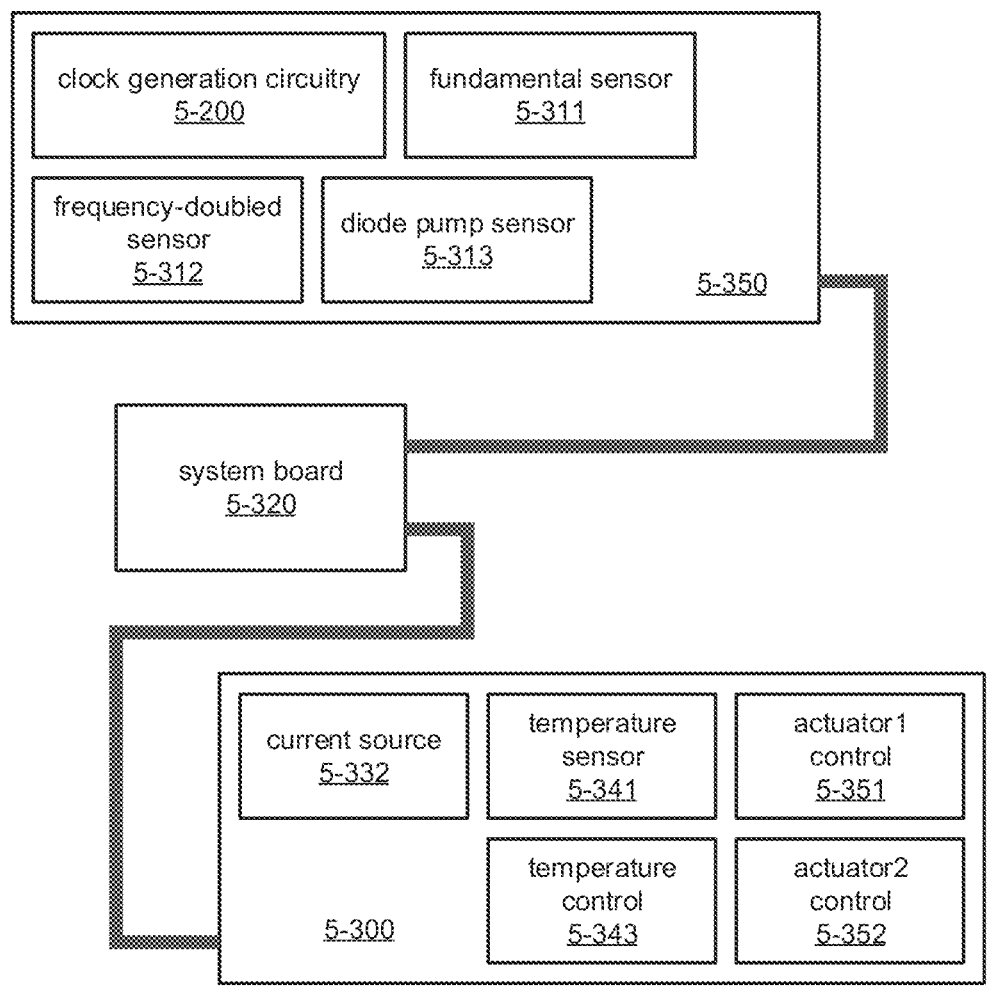
Figure 6:
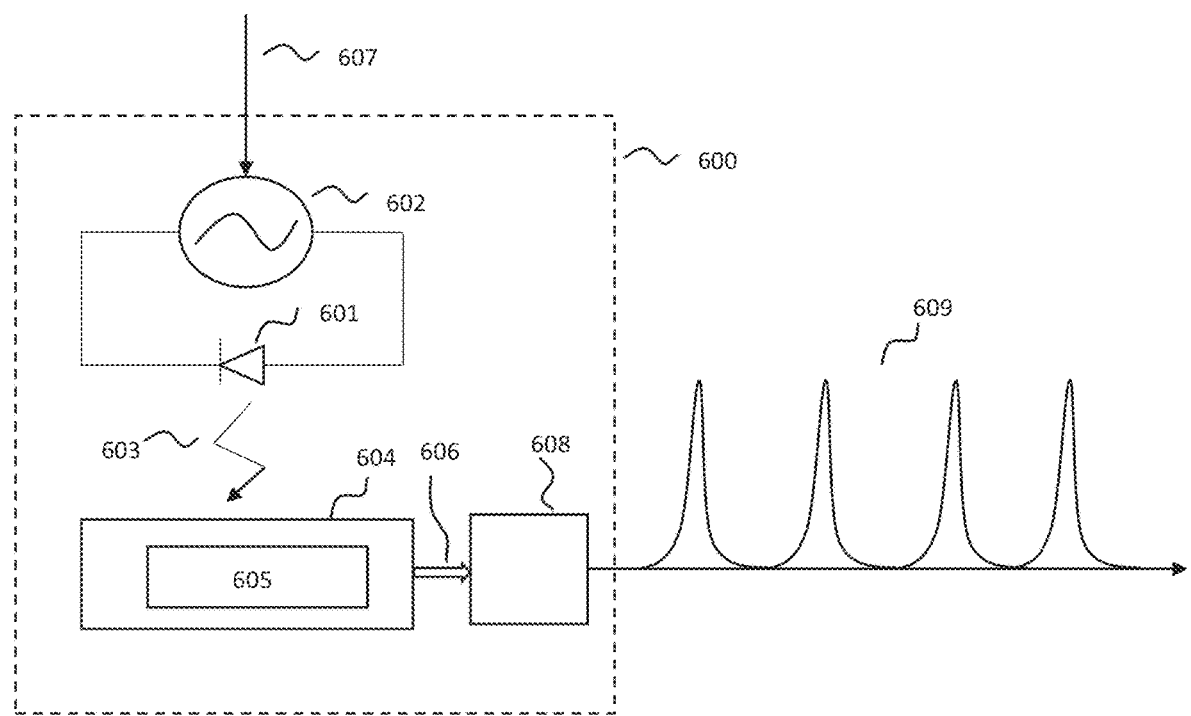
Figure 7:
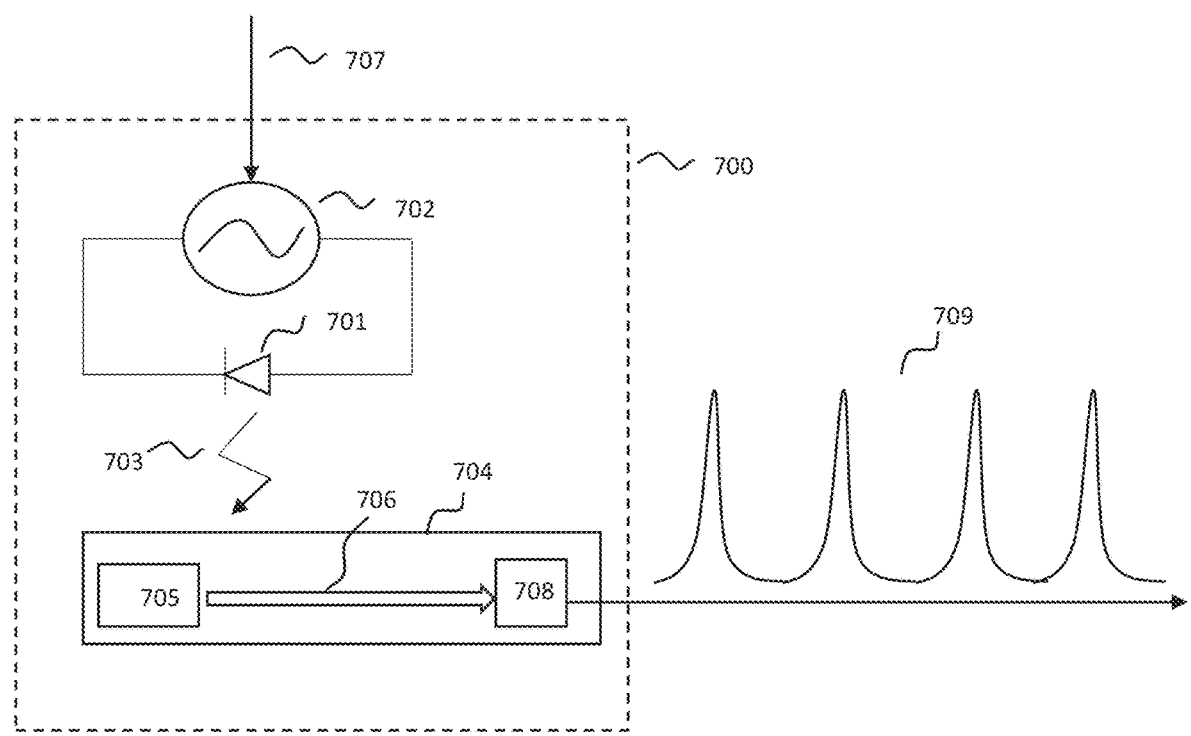

One example of an integrated non-adjustable mount for an output coupler or other optical component is depicted in FIG. 3-2A and FIG. 3-2B. The integrated mount can self-align the optical component to the optical axis 1-125 of the laser. An integrated optical mount 3-210 as shown in FIG. 3-2A can comprise an axial trench 3-220 machined or otherwise formed into the base chassis 2-105 of a mode-locked laser 1-110. The axial trench 3-220 can extend in a direction parallel to an optical axis of the mode-locked laser cavity. An integrated optical mount 3-210 can further comprise coplanar surfaces 3-230 formed approximately transverse to the axial trench 3-220. The coplanar surfaces can be formed by machining or milling a short trench in a direction that is approximately orthogonal to the axial trench 3-220. In some cases, the coplanar surfaces 3-230 can be oriented at a small angle, so that back reflections from a mounted optic will be displaced from the optical axis of the laser cavity. At the base of the axial trench 3-220 there can be sloped surfaces 3-240 (only one is visible in FIG. 3-2A). The sloped surfaces 3-240 can be machined, milled, or otherwise formed near the base of the axial trench and located on opposite sides of the axial trench 3-220. The sloped surfaces 3-240 can be inclined in a direction toward the coplanar surfaces 3-230, and provide support for an optic mounted thereon.

An optical component (optic) 3-250 for a mode-locked laser, for example, can be supported by the integrated optical mount 3-210, as depicted in FIG. 3-2B. The optic 3-250 can comprise a cavity mirror, a lens within the laser cavity, or the gain medium 1-105, for example. In some cases, the optic 3-250 can be mounted by itself in the integrated optical mount 3-210, as depicted in the drawing. In other embodiments, an optic can be mounted within a supporting fixture (e.g., an annular plate, an adjustable mount) that can be placed in the integrated optical mount 3-210.

According to some embodiments, an optical component 3-250, or supporting fixture, can include a flat surface that registers to and rests against the coplanar surfaces 3-230 of the integrated optical mount 3-210. The optic or fixture can be retained in the integrated mount by a compliant retaining device (e.g., an O-ring mounted on a bar that can be fastened to the base chassis, a flexible plastic bar or arm, etc.). The compliant retaining device can contact a top edge of the optic 3-250 or supporting fixture, and can exert forces on the optic or fixture in directions towards inclined surfaces 3-240 and the coplanar surfaces 3-230. A lower edge of the optic 3-250 or supporting fixture can contact points on the inclined surfaces 3-240. The inclined surfaces 3-240 can also provide a force against the optic or fixture having a component that is directed in part toward the coplanar surfaces 3-230. The contact points at the inclined surfaces 3-240 and forces directed toward the coplanar surfaces 3-230 can self-align the optic or fixture to a desired orientation and location within the laser cavity. In some implementations, an optic or supporting fixture can be bonded in the integrated optical mount (e.g., with an adhesive) in an aligned orientation.

One or more integrated optical mounts 3-210 can be formed in a base chassis of a mode-locked laser 1-110, according to some embodiments. In some cases, an axial trench 3-220 can extend through several integrated optical mounts, as depicted in FIG. 3-2A. Among the advantageous features of an integrated optical mount are a lowering of the mode-locked laser's optical axis. This can reduce effects of mechanical vibrations that might otherwise couple into and be amplified by optical mounts extending from a surface of the base chassis, and can reduce effects of thermal expansion (e.g., slight warping of the base chassis 2-105) that might otherwise be amplified by motion of optical mounts extending from a surface of the base chassis.

Referring again to FIG. 2-1, the inventors have discovered that changing a distance between the output coupler 1-111 and the gain medium 1-105 can change the FWHM value of the mode-locked pulse temporal profile (also referred to as pulse duration). Mode-locking of the laser can be achieved with the distance between the output coupler 1-111 and the gain medium 1-105 varied between 0 mm and 10 mm, and the pulse duration can be varied between approximately 9 picoseconds and approximately 38 picoseconds over this range of distances by selecting different distances to obtain different pulse durations. According to some embodiments, the distance between the output coupler 1-111 and the gain medium 1-105 is set between 4 mm and 8 mm.

The inventors have also discovered that stable and efficient operation over a range of average lasing powers is achieved when the intracavity beam waist of the laser at the output coupler 1-111 is between 100 microns and 180 microns. The value of the beam waist at the output coupler 1-111 is determined in part by intracavity optics, such as curved mirror 2-117, by distance of the output coupler to the curved mirror, and by the pump beam waist in the gain medium 1-105. According to some embodiments, the beam waist of the lasing wavelength in the gain medium can be significantly smaller that the pump beam waist in the gain medium 1-105. For example, the beam waist for the lasing wavelength in the gain medium can be between 100 microns and 150 microns in the gain medium, and a smallest waist for the pump beam can be between 180 microns and 250 microns, wherein the pump beam may not be fully symmetric about its optical axis. The value of the beam waist at the output coupler 1-111 and in the gain medium 1-105 may also be affected by the focal length of the second curved mirror 2-127 and its distance to the saturable absorber mirror 1-119. Having a smaller beam waist for the lasing beam of the mode-locked laser 1-110 than the laser diode pump beam can improve stability of the mode-locked laser operation (e.g., make the laser less susceptible to power and mode-locking fluctuations due to relative motion of the laser beam and laser diode pump beam in the gain medium 1-105. The term "beam waist" is used to refer to the spatial extent at which the laser beam intensity falls from a peak value to a 1/e2 value on opposite sides of the beam. A round beam may be characterized by a single beam waist. An elliptical beam may be characterized by two beam waists: one for the beam's minor axis and one for the beam's major axis.

At an opposite end of the laser cavity, a saturable absorber mirror (SAM) 1-119 be mounted. Referring to FIG. 3-3, the SAM can comprise a multilayer semiconductor structure 3-312 that exhibits nonlinear optical absorption (e.g., a multiple quantum well) and a high reflector 3-330 formed on a substrate 3-305. The nonlinear optical absorption can induce passive mode locking in the laser. For example, the SAM can exhibit higher absorption and loss at low optical intensities, and can bleach or exhibit little absorption and less loss at high optical intensities. The semiconductor structure 3-312 can be spaced from the high reflector 3-330 in the SAM so that the semiconductor structure is located at approximately a peak intensity of an optical standing wave created by the optical field incident on and reflected from the high reflector 3-330. An example of a SAM is part number SAM-1064-5-10ps-x available from BATOP Optoelectronics GmbH of Jena, Germany. Because of the SAM's nonlinear optical absorption, the laser preferentially operates in a pulsed mode of operation (passively mode locked) since the high intensities of the optical pulses experience less loss in the cavity than lower intensity, continuous-wave operation of the laser.

In some implementations, a SAM 1-119 can be mounted on a rotating and/or transverse-positioning mount, so that the SAM's surface can be moved in a direction transverse to the optical axis 1-125 (the Z axis in the drawing). Should the SAM become damaged, the SAM can be moved and/or rotated so that the intracavity beam is focused onto an undamaged region of the SAM. In some cases, the SAM 1-119 can be mounted on a mount that provides angular adjustment, e.g., to aid in alignment of the laser cavity.

In other embodiments, the SAM can be mounted on a non-adjustable mount 2-119. The non-adjustable mount can include a thermal conductor such as aluminum or copper that dissipates heat from the SAM to the base chassis 2-105 (not shown in the drawing). In some embodiments, the SAM mount 2-119 can comprise a plate of aluminum or copper or any suitable thermally-conductive material to which the SAM is adhered with a thermally-conductive adhesive. In some implementations, the SAM can be adhered to a copper foil on a piece of a printed circuit board, which is used as the SAM mount 2-119. The SAM mount can be attached to a machined surface in the base chassis or a surface of a fixture attached to the base chassis with one or more screws that allow the same to be roughly aligned to the optical axis 1-125 of the laser. For example, the SAM mount can be crudely positioned by hand in X and Y directions when secured to the base chassis, but otherwise not provide for fine angular adjustment (e.g., in two degrees of freedom) of the SAM's surface with respect to an optical axis of an intracavity beam of the mode-locked laser that is incident on the SAM. Other optical components in the laser cavity can be used to adjust the incident angle and position of the optical axis on the SAM. By mounting the SAM 1-119 on a fixed mount, cost and complexity associated with a multi-axis/multi-angle adjustment mount can be eliminated.

According to some embodiments, the SAM can be formed from a gallium-arsenide semiconductor composition. The SAM can be cut from a larger substrate or wafer, and can be square in shape with a maximum dimension across the face of the SAM between 1 mm and 3 mm. A relaxation time of the SAM's absorption can be between 10 ps and 30 ps. A non-saturated absorption of the SAM can be between 2% and 6%. The modulation depth of the SAM can be between 60% and 74% of the SAM's non-saturated absorption. In some implementations, the relaxation time is approximately 25 ps and the non-saturated absorption is approximately 4%. Such a SAM 1-119 can support mode-locked lasing with pulse durations between 12 ps and 20 ps. A saturation fluence of the SAM can be about 70 microJoules/cm2 (µJ/cm2), in some embodiments.

The inventors have recognized and appreciated that the optical fluence on the SAM from the intracavity laser beam should be kept below 2.5 milliJoules/cm2 (mJ/cm2) for prolonged operation of a gallium-arsenide SAM. At values equal to 5 mJ/cm2 or higher, the SAM may damage. In some implementations, the fluence on the SAM can be kept below about 10 times the saturation fluence of the SAM. The fluence on the SAM can be controlled by controlling the beam waist at the SAM (e.g., with a curved mirror 2-127 located in the laser cavity) and by controlling the intracavity power with the choice of reflectivity of the output coupler 1-111. According to some embodiments, a beam waist at the SAM is between 80 microns and 120 microns when the output coupler reflectivity is between 82% and 88%.

Between the output coupler 1-111 and the SAM 1-119, there can be a plurality of mirrors that fold the optical axis of the laser cavity multiple times. Some of these mirrors (e.g., mirrors 2-115, 2-120, 2-121, 2-122, 2-123, 2-124, 2-125 referring to FIG. 2-1) can have flat surfaces and be mounted in non-adjustable mounts. According to some embodiments, two of the mirrors 2-117, 2-127 can have curved surfaces and comprise a focusing reflector. In some cases, another type of focusing optic (e.g., a lens or compound lens) can be used instead of focusing reflectors for mirrors 2-117, 2-127 (e.g., if the intracavity beam is not folded at the location of the mirrors 2-117 or mirror 2-127). For flat and curved mirrors that are used to fold the optical axis of the laser, the reflectivity of the mirror can be very high for the lasing wavelength at the angle of incidence for which the mirror will be used. For example, the reflectivity for such a mirror can be greater than 99% in some cases, and yet greater than 99.5% in some cases. The surface quality of one or more of the folding mirrors can be at least 10-5 (scratch and dig) and a wavefront error can be at most $\lambda/10$. In some cases, the surface quality of one or more of the folding mirrors can be at least 40-20 (scratch and dig) and a wavefront error can be at most $\lambda/10$. A higher value for scratch-dig surface quality can significantly reduce the cost of the folding mirrors.

In some implementations, at least one of the mirrors (e.g., mirror 2-124) can fold the intracavity beam multiple times for a single transit from the gain medium 1-105 to the SAM 1-119. For the example configuration shown in FIG. 2-1, a bounce sequence for an optical pulse 1-120 travelling from the gain medium 1-105 to the SAM 1-119 is a sequence of reflections from mirrors 2-115, 2-117, 2-120, 2-121, 2-122, 2-123, 2-124, 2-125, 2-124, 2-127, 2-124, and then to the SAM 1-119. In this sequence, one of the intracavity mirrors 2-124 is used for multiple reflections and the angle of incidence is reversed in sign on this mirror for at least two reflections as the beam travels from one end of the laser cavity to the other end. For example and referring to FIG. 2-1, the first angle of incidence is in the +Z direction and the second angle of incidence on mirror 2-124 is in the −Z direction as the beam travels from the output coupler 1-111 to the SAM 1-119. After reflecting from the SAM 1-119, the pulse will then return in the reverse bounce sequence to the gain medium. By having multiple folds of the optical axis within the compact laser module, the cavity length can be extended to obtain a pulse repetition rate below 200 MHz and as low as 50 MHz. The pulse repetition rate will depend upon the length of the laser cavity, which is determined in part by the number of bounces between mirrors in the cavity and the distances between the mirrors. According to some embodiments, the pulse repetition rate can be changed by relocating mirrors and adding or removing mirrors within the cavity between the first curved mirror 2-117 and the second curved mirror 2-127 to increase or decrease the optical path length between the output coupler 1-110 and saturable absorber mirror 1-119. Because the intracavity beam is approximately collimated between the first curved mirror 2-117 and the second curved mirror 2-127, changes to pulse repetition rate can be made more easily than if the beam were not collimated in this region. In some implementations, extra integrated optical mounts can be formed in the base chassis for relocating mirrors to obtain different pulse repetition rates.

As noted above, the inventors have recognized and appreciated that pulse repetition rates below 200 MHz and as low as 50 MHz are desirable for massively-parallel analysis of samples on a bio-optoelectronic chip. However, using multiple mirrors, with some mirrors used multiple times, requires a very high degree of stability of the mirrors with respect to each other to maintain stable mode-locked lasing over periods of hours. Integrated mounting of the mirrors against supporting surfaces in a base chassis 2-105 that includes strengthening ribs can achieve the requisite stability of the mirrors and stable mode-locking operation.

An example of a non-adjustable mount for a folding mirror is shown in FIG. 3-4. According to some embodiments, the mount can be machined or otherwise formed into the base chassis 2-105. The mount can comprise a supporting and aligning wall 3-410 located adjacent to two sloped surfaces 3-424 that are spaced apart. The sloped surfaces can be formed on two protrusions 3-420, according to some embodiments. In some implementations, there can be a single sloped surface. The sloped surface or surfaces can be inclined toward the aligning wall 3-410, as illustrated in the drawing. There can be one or more threaded holes 3-430 adjacent to the wall. An optical component (e.g., a flat mirror or curved mirror) can be placed on the sloped surface or surfaces 3-424 with a back side resting against the aligning wall 3-410. A clamping component (not shown) having a pliable or flexible component can be secured via the threaded hole 3-430 or holes to retain the optical component against the aligning wall.

The aligning wall 3-410 can be machined in the base chassis 2-105 with a selected orientation, so that an optical component held against the aligning wall 3-410 will be approximately aligned at desired angles with respect to a planned optical axis of the laser beam through the laser cavity. The inventors have recognized and appreciated that aligning walls 3-410 can be formed to a high degree of angular accuracy by machining for angles lying within a plane parallel to the base chassis (e.g., for angles that define incident and reflection angles of the laser beam in an XZ plane in FIG. 2-1). However, the machining accuracy of forming the aligning walls 3-410 is appreciably less for angles that would deflect the laser beam out of a plane parallel to the base chassis. Accordingly, one of the mirror mounts between the gain medium 1-105 and SAM 1-119 can include an angular adjustment (one degree of freedom) to accommodate for manufacturing errors that would cause deflection of the laser beam out of a plane parallel to the base chassis. According to some embodiments, the mirror mount having a single degree of freedom is located between one-quarter and three-quarter of the distance between the gain medium and SAM.

In some implementations, one folding mirror 2-115 can be configured to control polarization of radiation within the cavity and allow monitoring of pump-beam radiation (indicated as the heavy dashed line in FIG. 2-1). For example, the folding mirror 2-115 can be coated to reflect s polarization (polarization that is out of the plane of the base chassis, in the Y direction) with a high reflectivity greater than 99%, or even greater than 99.5% in some cases, and to have a lower reflectivity for the orthogonal p polarization, so that lasing in the p polarization is prevented. In some cases, the folding mirror 2-115 can be a polarizing beam splitter that transmits more than 20% of the p polarization and reflects the s polarization with high reflectivity. The folding mirror 2-115 can additionally transmit most or nearly all of the pump-beam radiation to a photodetector 2-116 located behind the mirror. The folding mirror can include a dichroic coating to allow transmission of the pump-beam radiation, in some embodiments. In other embodiments, a dichroic coating may not be used, and the coating for the lasing wavelength may allow adequate transmission of the pump-beam radiation through the folding mirror 2-115 for detection. An output from the photodetector 2-116 can be provided to the PCB 2-190 for signal processing and/or transmission to an external signal processor.

In some embodiments, two curved mirrors 2-117, 2-127 can be designed and located within the laser cavity to obtain desired beam waist sizes within the gain medium 1-105 and the SAM 1-119. A first curved mirror 2-117 can be located in a first portion of the laser cavity near the gain medium 1-105. A second curved mirror 2-127 can be located in a second portion of the laser cavity near the SAM 1-119. At least between the curved mirrors, there can be a plurality of folding mirrors that fold the optical axis of the laser and extend the laser cavity length in a cavity length extending region. There can additionally be a mirror 2-124 between curved mirror 2-127 and the SAM 1-119 that folds the intracavity laser beam multiple times to extend the length of the cavity in the cavity length extending region. For example, curved mirror 2-127 and mirror 2-124 can fold the intracavity beam three times on immediately successive bounces from these two reflectors, as indicated in FIG. 2-1.

According to some embodiments, the first curved mirror 2-117 can be a spherical reflector and have a focal length f1 between 240 mm and 260 mm. A tolerance on the focal length for this reflector can be ±1% of the focal length. The inventors have found that the first curved mirror 2-117, with a focal length of approximately 250 mm, can be placed between 230 mm and 310 mm from the output coupler 1-111 and stable mode-locked operation having different characteristics can be obtained. According to some embodiments, the first curved mirror can be located between 280 mm and 300 mm from the output coupler to obtain stable mode-locked operation over a large range of operating powers of the compact laser module. In this configuration, the gain medium 1-105 can be located between 4 mm and 8 mm from the output coupler. The focal length of the first curved mirror 2-117 and its location with respect to the gain medium 1-105 and output coupler 1-111, and the focal length of the second curved mirror 2-127 and its location with respect to the SAM 1-119 can determine the beam waist of the intracavity beam in the gain medium.

A focal length of the first curved mirror 2-117 may have other values in other embodiments. For example, a shorter focal length f1<230 mm can be used for a more compact mode-locked laser that operates at lower powers. In embodiments, the output coupler 1-111 can be placed a distance d1 from the first curved mirror 2-117 that is in a range of values within 30% of the focal length f1 (e.g., 0.7f1<d1<1.3f1). In some cases, 0.9f1<d1<1.3f1.

In some implementations, the first curved mirror 2-117 can be mounted in an adjustable mount that provides only two degrees of freedom for adjusting orientation angles (in-plane, and out-of-plane angles) of the mirror with respect to the optical axis of the laser. An adjustable mount can allow an operator to finely adjust the position (one or more of X, Y, Z) and/or orientation (pitch and/or yaw with respect to the optical axis of the incident intracavity beam) of the optical component while the laser is lasing, so that operation of the laser can be tuned for stability, beam quality, output power, and/or pulse characteristics. Fine tuning can be achieved by micrometers and/or finely-threaded screw adjustments on mirror mounts, for example.

Providing only two degrees of freedom for the first curved mirror 2-117 and only one degree of freedom for a folding mirror (e.g., mirror 2-123) as the only adjustments for aligning the laser cavity in real time while the laser is lasing can reduce cost and complexity of the compact mode-locked laser module. In other cases, the mirror mount for the first curved mirror 2-117 can include additional degrees of freedom for adjusting the position of the mirror, for example. According to some embodiments, adjustments can be made to the pump module 2-140 after adjusting curved mirror 2-117 to align or re-align the pump beam and increase output power from the mode-locked laser.

A second curved mirror 2-127 can be a spherical reflector and have a focal length f2 between 240 mm and 260 mm. A tolerance on the focal length for this reflector can be ±1% of the focal length. The inventors have found that the second curved mirror 2-127, with a focal length of approximately 250 mm, can be placed between 260 mm and 290 mm from the SAM 1-119 and stable mode-locked operation having different characteristics can be obtained. According to some embodiments, the second curved mirror can be located between 270 mm and 285 mm from the SAM 1-119 to obtain stable mode-locked operation over a large range of operating powers of the compact laser module. The focal length of the second curved mirror 2-127 and its location with respect to the SAM 1-119 can determine the beam waist of the intracavity beam at the SAM 1-119 and also affect the beam-waist at the gain crystal.

A focal length of the second curved mirror 2-127 may have other values in other embodiments. For example, a shorter focal length f2<240 mm can be used for a more compact mode-locked laser that operates at lower powers. In embodiments, the SAM 1-119 can be placed a distance d2 from the second curved mirror 2-127 that is in a range of values within 20% of the focal length f2 (e.g., 0.8f2<d2<1.2f2). In some cases, f2<d2<1.2f2.

The second curved mirror 2-127 can be mounted in a non-adjustable mount, as described above in connection with FIG. 3-4, for example, to reduce cost and complexity of the laser module. As described above, all of the reflective components in the laser cavity (except the first curved mirror 2-117 and the folding mirror 2-123) can be mounted in self-aligning, non-adjustable mounts. Further, the first curved mirror 2-117 can have only two degrees of freedom for angular adjustments and the folding mirror 2-123 can have only one degree of freedom for angular adjustment. The inventors have discovered that the mode-locked laser cavity can be aligned for stable operation for long periods of time using only these three adjustments, according to some embodiments. For example, the first curved mirror 2-117 can be used to steer a beam from the gain medium 1-105 to the SAM 1-119, which is mounted in a fixed location to receive the beam. Any out-of-plane deviations (in the ±Y directions in FIG. 2-1) can be accommodated by adjusting the single degree of angular adjustment on folding mirror 2-123. If the SAM 1-119 does not receive the intracavity beam at normal incidence so as to reflect the beam back along the same path, the angle of incidence on the SAM can be adjusted by translating the intracavity beam on the second curved mirror 2-127. Since the SAM 1-119 is nearly at the focus of the second curved mirror, a translation of the beam on this mirror alters the incidence angle at the SAM. The intracavity beam can be translated across the surface of the second curved mirror by making angular adjustments to the first curved mirror 2-117. Adjustments can be made to the first curved mirror until the intracavity beam is reflected back on itself from the SAM 1-119.

The inventors have discovered that the spot size of the intracavity laser beam on the SAM can be more sensitive to changes in distance between the first curved mirror 2-117 and the laser's output coupler 1-111 than to changes in distance between the second curved mirror 2-127 and SAM 1-119. This result relates to the extended cavity length between the first curved mirror 2-117 and the second curved mirror 2-127. This extended cavity length can be more than half the length of the laser cavity, throughout which the intracavity laser beam can be approximately collimated. Changes in the distance between the curved mirror 2-117 and output coupler 1-111 can affect collimation in the extended cavity, which can amplify changes in beam size at the second curved mirror 2-127. The amplification in turn affects the spot size in the SAM 1-119 more strongly than changes in distance between the second curved mirror 2-127 and SAM 1-119. Accordingly, the position of the first curved mirror 2-117 can be used to adjust the fluence on the SAM 1-119. In some embodiments, the amplification effect can be reduced by increasing the focal length of the second curved mirror 2-127.

When the laser cavity is aligned and configured as described above, such that a beam waist in the gain medium 1-105 is between 100 microns and 150 microns, and the beam waist at the SAM 1-119 is between 80 microns and 120 microns, the inventors have discovered that the laser cavity satisfies a "stability criterion" for optical resonators (a condition known to those skilled in the art of lasers) that spans a change from 0 diopter to 15 diopters of thermal lensing effects in the gain medium 1-105 and for focal length errors of the two curved mirrors 2-117, 2-127 of +1%. At high optical powers, the gain medium 1-105 can acquire appreciable heat from the pump radiation, and the heated gain medium can create an optical lens (also referred to as thermal lensing) that has a focusing power (diopter) that is dependent upon the temperature of the medium. For optically-pumped, high-power lasers, the changes due to this thermal lensing can destabilize the laser and extinguish lasing for increases in pump power by 50% from an initial stable operating point. The inventors have observed that the compact mode-locked laser module 1-108 maintains stable mode-locking operation for variations in pump power from 2 Watts to 8 Watts, an increase of 300% in pump power from an initial stable operating point. The range of stability for the laser cavity is surprisingly large, and allows the compact mode-locked laser to be operated over a large range of intracavity and output powers. For example, the average output power from the laser can vary between 350 milliwatts and 3.5 Watts over this range of pump power, while the FWHM pulse duration remains between 12 picoseconds and 18 picoseconds. This output can be frequency doubled to produce pulses of a same duration at a wavelength of 532 nm, for example, with average power levels between 100 milliwatts and 1.5 Watts.

According to some embodiments, there can be optical components mounted within the laser cavity to help stabilize operation of the mode-locked laser and/or improve beam quality of the mode-locked laser. For example, a spatial mode filter 2-118 can be located in the laser cavity and configured to prevent lasing in higher-order spatial modes. The mode filter 2-118 can comprise an aperture of any suitable shape (e.g., round, oval, crescent shaped, square, rectangular, polygonal, etc.). The aperture can be mounted in a non-adjustable mount, or can be mounted such that it can be moved in directions transverse to the intracavity beam's optical axis. The size of the aperture can be adjustable in some cases (e.g., an iris). In various embodiments, the aperture constrains lasing operation to the lowest-order transverse spatial mode of the laser cavity, which can improve stability of mode locking.

Beam steering components can be included in the laser module 1-108 in some embodiments for dynamic stabilization and alignment. For example, one or more anti-reflection coated laser windows or optical flats 2-128 that can be rotated at an angle with respect to the intracavity beam can be operated automatically by an actuator 2-162 to translate and/or change an incident angle of the intracavity beam on the SAM 1-119. There can be mechanical linkage 2-164 between an actuator and laser window and a pitch or yaw mount for the laser window that enable automated pitch or yaw adjustments to the laser window 2-128. The actuator 2-162 can comprise a stepper motor, piezoelectric transducer, capacitive transducer, or any other suitable actuator.

Rotation of an intracavity laser window will shift laterally the outgoing beam from the laser window in the direction of rotation. The amount of lateral shift can be determined by applying Snell's law to the two interfaces of the laser window. If the laser window is located between the second curved mirror 2-127 and the SAM 1-119, then rotation of the laser window will mainly translate the intracavity beam on the SAM. Rotation of such laser window can be used to extend the lifetime of the SAM by moving the intracavity beam across the SAM. A scanning motion my reduce fatigue of the SAM, or if the SAM has been damaged the beam can be moved away from the damaged spot. If the laser window 2-128 is located before the second curved mirror 2-127 as depicted in FIG. 2-1, then rotation of the laser window will mainly change the incident angle of the intracavity beam on the SAM. Rotation of such laser window can be used to dynamically align or realign the laser cavity to obtain and/or maintain stable mode-locked operation.

Signals that indicate laser performance and that can be used for automatically adjusting intracavity beam-steering components can include any one or combination of pump power (detected with photodetector 2-116 or a pump photodetector (not shown) that is mounted in the pump module), laser power and/or pulse characteristics (detected with a laser output photodetector 2-154, which can be sensitive to the lasing wavelength), and second-harmonic power (detected with a doubled-output photodetector 2-182). The signal or signals can be provided to circuitry on PCB 2-190 for processing and generation of feedback control signals to operate one or more actuators 2-162. In some embodiments, one or both of the laser output photodetector 2-154 and doubled-output photodetector 2-182 can be mounted on the PCB 2-190 and received radiation through a hole and/or window (not shown) located in a side of the mode-locked laser module 1-108. In some implementations, rotation of an intracavity beam-steering component can be automated to fine tune cavity alignment and/or change a position of the intracavity beam on the SAM 1-119 based on one or more feedback signals.

According to some embodiments, cavity alignment can be obtained additionally or alternatively by inducing asymmetric thermal gradients in the gain medium 1-105. Asymmetric thermal gradients can affect thermal lensing and alter the refractive index within the gain medium 1-105 in such a way to cause small angular deflections in the intracavity laser beam as it passes through the gain medium 1-105. In some implementations, one or more temperature-controlling devices (e.g., resistive heating elements, TEC coolers, or a combination thereof) can be coupled to one or more sides of the gain medium. According to some embodiments, the gain medium 1-105 can have two to four independently-operable, temperature-controlling devices (not shown in FIG. 2-1) thermally coupled to two to four faces (four longitudinal edges) of the gain medium. Thermal coupling can comprise thermal epoxy or indium foil located between a temperature-controlling device and face of the gain medium 1-105. A temperature-controlling device can also include thermal coupling to a heat sink (such as the laser block) on an opposite side of the temperature-controlling device. In some cases, operation of one or more of the temperature-controlling devices can provide beam deflection transverse to the optical axis 2-111. By selectively altering temperatures at the temperature-controlling devices, the intracavity laser beam can be steered and re-aligned. In some cases, one or more intracavity laser windows 2-128 can be adjusted in tandem with thermal beam steering in the gain medium to reposition the intracavity beam on the SAM, for example, and/or maintain stable mode-locked operation of the laser.

The inventors have recognized and appreciated that average power and/or spectral characteristics of the mode-locked laser can be determinative of stable, mode-locked operation. For example, if the laser's average power during mode-locked operation falls below a certain value, there may not be enough nonlinear optical absorption in the SAM 1-119 to support mode locking. The laser may then Q-switch and damage the SAM 1-119. In some cases, rapid fluctuations of the laser's average output power may indicate that the laser is Q-switching in addition to mode locking, which can damage the SAM 1-119. In some embodiments, at least one sensor 2-154 (e.g., a photodiode) can be included and arranged to sense optical power produced by the laser 1-110 and/or output pulse or mode-locking characteristics of the laser. For example, a signal from a first sensor 2-154 can be spectrally analyzed to detect sidebands near the mode-locking frequency, which can indicate the onset of Q-switching and/or instabilities in the mode-locked pulse train of the laser 1-110. A second sensor (not shown) can detect average optical power produced by the laser 1-110. If the sensed average laser power drifts below a preset level and/or if sidebands or power fluctuations are detected by the first sensor 2-154, an automated cavity alignment routine can be executed to recover power and/or the laser can be shut off for servicing. In some cases, sidebands that indicate instabilities in the mode-locked pulse train are due to lasing of higher-order spatial cavity modes. Such instabilities can be corrected by adjusting an intracavity spatial mode filter 2-118 automatically or manually, for example. According to some embodiments, one or more sensors 2-154 that are sensitive to the lasing wavelength can be mounted on PCB 2-190.

In some cases, additional signals can be processed to analyze laser behavior. For example, the pump power can be evaluated with a pump power sensor 2-116 (which can be a photodiode or other suitable photodetector) in conjunction with the average power level from the laser. In some embodiments, the amount of frequency-doubled power can be monitored with sensor 2-182 (which can be a photodiode or other suitable photodetector) additionally or alternatively. For example, a reduction in average frequency-doubled power while the average laser power remains nearly constant could indicate changes in mode-locked pulse length, or a problem with the frequency-doubling optical components.

In operation, a mode-locked laser 1-110 that employs Nd3+: YVO4 as the gain medium and arranged as described above can produce pulses at 1064 nm having a FWHM value of approximately 15 ps. The pulse extinguishes by approximately 80 dB within 100 ps from the peak of the pulse. The pulse repetition rate is approximately 67 MHZ, and the average power of the mode-locked laser at the fundamental wavelength can be varied from 350 mW to 3.5 W. The conversion efficiency to a frequency-doubled wavelength (described further below) can be as high as 30% in some cases, so that pulses at 532 nm can be produced with average output powers between 100 mW and 1.5 W. In some cases, the conversion efficiency can be as high as 35%. The AC power required to operate the laser is less than about 20 Watts. The laser is compact, occupies a volume of less than 0.1 ft 3, weighs slightly less than 2 kilograms, and can be readily incorporated as a module into a portable analytic instrument, such as a table-top instrument for sequencing DNA.

Clock Generation for Analytical Instrument

The laser module 1-108 described above with reference to FIG. 2-1 may be used in a portable analytic instrument, such as analytic instrument 1-100 depicted in FIG. 1-2. The portable analytic instrument 1-100 can include an optical system 1-115 and an analytic system 1-160. The optical system 1-115 can include some combination of optical components (which may include, for example, none, one, or more of each of: lens, mirror, optical filter, attenuator, beam-steering component, beam shaping component) and be configured to operate on and/or deliver output optical pulses 1-122 from a mode-locked laser module 1-108 to the analytic system 1-160. The analytic system can include a plurality of components that are arranged to direct the optical pulses to at least one sample that is to be analyzed, receive one or more optical signals (e.g., fluorescence, backscattered radiation) from the at least one sample, and produce one or more electrical signals representative of the received optical signals. In some embodiments, the analytic system 1-160 can include one or more photodetectors and signal-processing electronics (e.g., one or more microcontrollers, one or more field-programmable gate arrays, one or more microprocessors, one or more digital signal processors, logic gates, etc.) configured to process the electrical signals from the photodetectors. The analytic system 1-160 can also include data transmission hardware configured to transmit and receive data to and from external devices via one or more data communications links. In some embodiments, the analytic system 1-160 can be configured to receive a bio-optoelectronic chip 1-140, which holds one or more samples to be analyzed.

Referring again to FIG. 1-2, regardless of the method and apparatus that is used to produce short or ultrashort-pulses, a portable analytic instrument 1-100 can include circuitry configured to synchronize at least some electronic operations (e.g., data acquisition and signal processing) of an analytic system 1-160 with the repetition rate of optical pulses 1-122 from the mode-locked laser 1-110. For example, when evaluating fluorescent lifetime in a bio-optoelectronic chip 1-140, it is beneficial to know the time of excitation of a sample accurately, so that timing of emission events can be correctly recorded. According to some embodiments, a timing signal can be derived from the optical pulses produced by the mode-locked laser, and the derived timing signal can be used to trigger instrument electronics.

The inventors have recognized and appreciated that coordination of operation of the mode-locked laser 1-110 (e.g., to deliver AM laser pulse trains to reaction chambers 1-330), signal-acquisition electronics (e.g., operation of time-binning photodetectors 1-322), and data read-out from the bio-optoelectronic chip 1-140 poses technical challenges, particularly when AM laser pulse trains are used. For example, in order for the time-binned signals collected at the reaction chambers to be accurate representations of fluorescent decay characteristics, each of the time-binning photodetector 1-322 must be triggered with precise timing after the arrival of each excitation optical pulse at the reaction chambers. Additionally, data must be read from the bio-optoelectronic chip 1-140 in approximate synchronicity with data acquisition at the reaction chambers to avoid data overruns and missed data. Missed data could be detrimental in some cases, e.g., causing a misrecognition of a gene sequence. The inventors have recognized and appreciated that system timing is further complicated by the variation in pulse amplitude as well as by natural operating characteristics of passively mode-locked lasers, e.g., fluctuations in pulse-to-pulse interval T, and occasional pulse drop-outs.

FIG. 5-1 depicts a system in which a timer 5-120 provides a synchronizing signal to the analytic system 1-160. In some embodiments, the timer 5-120 can produce a clock signal that is synchronized to optical pulses produced by the AM laser pulse train source 1-110, and provide the clock signal to the analytic system 1-160. In FIG. 5-1, the optical pulses 1-120 are depicted spatially as being separated by a distance D. This separation distance corresponds to the time T between pulses according to the relation T=D/c where c is the speed of light. In practice, the time T between pulses can be determined with a photodiode and oscilloscope. According to some embodiments, $T=1/f_{sync}N$ where N is an integer greater than or equal to 1 and $f_{sync}$ represents the frequency of a generated clock signal. In some implementations, $T=N/f_{sync}$ where N is an integer greater than or equal to 1.

According to some embodiments, the timer 5-120 can receive an analog or digitized signal from a photodiode that detects optical pulses from the pulse train source 1-110. The photodiode 2-154 can be mounted on the base chassis 2-105 and can be a high-speed InGaAs photodiode. The timer 5-120 can use any suitable method to form or trigger a synchronizing signal from the received analog or digitized signal. For example, the timer can use a Schmitt trigger or comparator to form a train of digital pulses from detected optical pulses. In some implementations, the timer 5-120 can further use a delay-locked loop or phase-locked loop to synchronize a stable clock signal from a stable electronic clock source to a train of digital pulses produced from the detected optical pulses. The train of digital pulses or the locked stable clock signal can be provided to the analytic system 1-160 to synchronize electronics on the instrument with the optical pulses.

The inventors have conceived and developed clock-generation circuitry that can be used to generate a clock signal and drive data-acquisition electronics in a portable instrument 1-100. An example of clock-generation circuitry 5-200 is depicted in FIG. 5-2. The clock generation circuitry can be included on a PCB 2-190 mounted on the base chassis 2-105. According to some embodiments, clock-generation circuitry can include stages of pulse detection, signal amplification with automatic gain control, clock digitization, and clock phase locking.

A pulse-detection stage can comprise a high-speed photodiode 5-210 that is reversed biased and connected between a biasing potential and a reference potential (e.g., a ground potential), according to some embodiments. A reverse bias on the photodiode can be any suitable value, and can be fixed using fixed-value resistors or can be adjustable. In some cases, a capacitor C can be connected between a cathode of the photodiode 5-210 and a reference potential. A signal from the anode of the photodiode can be provided to an amplification stage. In some embodiments, the pulse detection stage can be configured to detect optical pulses having an average power level between about 100 microwatts and about 25 milliwatts. The pulse-detection stage of the clock-generation circuitry 5-200 can be mounted on or near the mode-locked laser 1-110, and arranged to detect optical pulses from the laser.

An amplification stage can comprise one or more analog amplifiers 5-220 that can include variable gain adjustments or adjustable attenuation, so that pulse output levels from the analog gain amplifiers can be set within a predetermined range. An amplification stage of the clock-generation circuitry 5-200 can further include an automatic gain control amplifier 5-240. In some cases, analog filtering circuitry 5-230 can be connected to an output of the analog amplifiers 5-220 (e.g., to remove high-frequency (e.g., greater than about 500 MHZ) and/or low-frequency noise (e.g., less than about 100 Hz)). The filtered or unfiltered output from the one or more analog gain amplifiers 5-220 can be provided to an automatic gain control amplifier 5-240, according to some embodiments.

According to some embodiments, a final output signal from the one or more analog amplifiers can be positive-going. The inventors have recognized and appreciated that a subsequent automatic gain-control (AGC) amplifier operates more reliably when it input pulses to positive voltage rather than negative voltage. The automatic gain control amplifier can vary its internal gain to compensate for the amplitude variations in the received electronic pulse train (which are caused by the amplitude variations in the received laser pulses detected by photodiode 5-210). The output pulse train from the automatic gain control amplifier 5-240 can have approximately constant amplitude, as depicted in the drawing, whereas the input to the automatic gain control amplifier 5-240 can have fluctuations in the pulse-to-pulse amplitudes. An example automatic gain control amplifier is model AD8368 available from Analog Devices, Inc. of Norwood, Massachusetts.

In a clock digitization stage, an output from the automatic gain control amplifier can be provided to a comparator 5-250 to produce a digital pulse train, according to some implementations. For example, the pulse train from the AGC can be provided to a first input of the comparator 5-250, and a reference potential (which can be user-settable in some embodiments) can be connected to a second input of the comparator. The reference potential can establish the trigger point for the rising edge of each produced digital pulse.

As may be appreciated, variations in optical pulse amplitude would lead to variations in amplitudes of the electronic pulses before the AGC amplifier 5-240. Without the AGC amplifier, these amplitude fluctuations would lead to timing jitter in the rising edges of pulses in the digitized pulse train from the comparator 5-250. By leveling the pulse amplitudes with the AGC amplifier, pulse jitter after the comparator is reduced significantly. For example, timing jitter can be reduced to less than about 50 picoseconds with the AGC amplifier. In some implementations, an output from the comparator can be provided to logic circuitry 5-270 which is configured to change the duty cycle of the digitized pulse train to approximately 50%.

A phase-locking stage of the clock-generation circuitry 5-200 can comprise a phase-locked loop (PLL) circuit 5-280 that is used to produce one or more stable output clock signals for timing and synchronizing instrument operations. According to some embodiments, an output from the clock digitization stage can be provided to a first input (e.g., a feedback input) of a PLL circuit 5-280, and a signal from an electronic or electro-mechanical oscillator 5-260 can be provided to a second input (e.g., a reference input) to the PLL. An electronic or electro-mechanical oscillator can be highly stable against mechanical perturbations and against temperature variations in some cases. According to some embodiments, a phase of the stable clock signal from the electronic or electro-mechanical oscillator 5-260 is locked, by the PLL, to a phase of the digitized clock signal derived from the mode-locked laser, which can be less stable. In this manner, the electronic or electro-mechanical oscillator 5-260 can ride through short-term instabilities (e.g., pulse jitter, pulse drop outs) of the mode-locked laser 1-110, and yet be approximately synchronized to the optical pulse train. The phase-locked loop circuit 5-280 can be configured to produce one or more stable output clock signals that are derived from the phase-locked signal from the electro or electro-mechanical oscillator 5-260. An example circuit that can be used to implement the PLL is IC chip Si5338, which is available from Silicon Laboratories Inc. of Austin, Texas.

According to some embodiments, one or more clock signals output from the PLL circuit 5-280 can be provided to the bio-optoelectronic chip 1-140 to time data-acquisition electronics on the chip. In some cases, the PLL circuit 5-280 can include phase adjustment circuitry 5-282, 5-284 on its clock outputs, or separate phase adjustment circuits can be connected to clock outputs of the phase-locked loop. In some implementations, the bio-optoelectronic chip 1-140 can provide a pulse-arrival signal 1-142 from one or more photodetectors on the chip that indicate the arrival of optical excitation pulses from the mode-locked laser 1-110. The pulse-arrival signal can be evaluated and used to set the phase or phases of clock signals provided to the bio-optoelectronic chip 1-140. In some embodiments, the pulse-arrival signal can be provided back to the phased-locked loop circuit 5-280 and processed to automatically adjust the phase of the clock signal(s) provided to the chip, so that a trigger edge of a clock signal provided to drive data-acquisition on the bio-optoelectronic chip 1-140 (e.g., timing of signal acquisition by the time-binning photodetectors 1-322) is adjusted to occur at a predetermined time after the arrival of an optical excitation pulse in the reaction chambers.

According to some embodiments, a clock signal from the PLL circuit 5-280 can also be provided to one or more field-programmable gate arrays (FPGAs) 5-290 included in the instrument 1-100. The FPGAs can be used for various functions on the instrument, such as driving data read out from the bio-optoelectronic chip 1-140, data processing, data transmission, data storage, etc.

The inventors have recognized and appreciated that there can be an interplay between the loop bandwidth of the AGC amplifier 5-240 and the loop bandwidth of the phase-locked loop 5-290. For example, if the loop bandwidth of the phase-locked loop is too high, the PLL can respond to jitter introduced by the AGC amplifier and comparator in the digitized pulse train, and not accurately track the optical pulse timing. On the other hand, if either or both of the AGC and PLL loop bandwidths are too low, the resulting clock signals output from the PLL will not accurately track the optical pulse timing. The inventors have found that an integration time constant associated with the loop bandwidth of the PLL 5-290 should be between about 30 pulses and about 80 pulses of the optical pulse train from the mode-locked laser 1-110. Additionally, an integration time constant associated with the loop bandwidth of the AGC amplifier 5-240 should not exceed by more than about 20% the integration time constant for the PLL.

In some implementations, one or more signals from the amplification stage can be used for additional purposes in the instrument 1-100. For example, an analog signal 5-232 can be split off prior to the AGC amplifier 5-240 and used to monitor the quality of mode locking in the mode-locked laser 1-110. For example, the analog signal 5-232 can be analyzed electronically in the frequency and/or time domain to detect characteristics that are indicative of the onset of Q-switching by the mode-locked laser. If the characteristics (and onset of Q-switching) are detected, the system can automatically make adjustments to optics within the mode-locked laser (e.g., cavity-alignment optics) to avoid Q-switching, or the system can indicate an error and/or shut down the mode-locked laser.

In some embodiments, an AGC amplifier can provide an output signal 5-242 (analog or digital) that is representative of real-time gain adjustments that are needed to level the amplitudes of the output pulses. The inventors have recognized and appreciated that this output signal 5-242 can be used to evaluate mode-locking quality of the mode-locked laser. For example, its spectrum can be analyzed to detect the onset of Q-switching.

Although clock generation and synchronization has been described using an automatic gain control amplifier and a phase-locked loop, alternative apparatus can be used in other embodiments for which a larger amount of clock jitter (e.g., up to about 300 ps) can be tolerated. In some implementations, an amplifier in the pulse amplification stage can be driven into saturation to provide a rising edge trigger signal. A trigger point for a clock can be set at some value on the rising edge. Because the amplifier saturates, variations in pulse amplitude have less of an effect on the trigger timing than for a non-saturated amplifier. The rising edge can be used to toggle a flip-flop clocking circuit, such as those implemented in field-programmable gate arrays (FPGAs). The falling edge from the saturated amplifier returning back to zero can have appreciably more timing variability, depending on when the output of the amplifier is released from saturation. However, the falling edge is not detected by the flip-flop clocking circuit and has no effect on the clocking.

Many FPGAs include digital delay-lock loops (DLL) which can be used instead of a PLL to lock a stable oscillator to the laser-generated clocking signal from the flip flop. In some embodiments, the receiving flip-flop divides the clocking rate from the optical pulse train by two, which can provide a 50% duty-cycle clock signal to the DLL at one-half the pulse repetition rate. The DLL can be configured to generate a frequency-doubled clock to be synchronized with the optical pulse train. Additional synchronized, higher-frequency clocks can also be generated by the DLL and FPGA.

An example of system circuitry for system control is depicted in FIG. 5-3, according to some embodiments. A pump-module control circuit 5-300 can be assembled on a PCB and mounted to the compact mode-locked laser module 1-108 (e.g., mounted on a back side of the module 1-108 shown in FIG. 2-1). The pump-module control circuit 5-300 can interface with a system board 5-320 and a clock-generation and laser-sensing circuit 5-350 (e.g., PCB 2-190) that is mounted on the laser module 1-108. In some implementations, the pump-module control circuit 5-300 and clock-generation and laser-sensing circuit 5-350 can be assembled on a same PCB. In other implementations, the pump-module control circuit 5-300, clock-generation and laser-sensing circuit 5-350, and system control circuitry can be assembled on a same PCB, so that a separate system board 5-320 is not used.

The system board 5-320 can include a central processor (e.g., a microcontroller or microprocessor) that coordinates operation of the system in which the laser module 1-108 is mounted. The system board 5-320 can further include power distribution circuitry and data handling circuitry (e.g., memory, transceiver, network interface board, etc.).

In some embodiments, the pump-module control circuit 5-300 can include a current source 5-332 configured to supply variable current in a pattern corresponding to a desired pulse train waveform shape to the laser diode 4-130 that is used to pump the gain medium 1-105 in order to cause an AM laser pulse train to be produced. The current source 5-332 can be controlled via the system board 5-320, according to some embodiments. The pump-module control circuit 5-300 can further include temperature sensing circuitry 5-341 that can connect to a temperature sensor or thermistor (not shown) on the laser diode 4-130. Output from the temperature sensing circuitry 5-341 can be provided to temperature controlling circuitry 5-343, which can drive a TEC 4-160 on which the laser diode 4-130 is mounted. The temperature controller can receive control signals from the system board 5-320 for adjusting and/or stabilizing a temperature of the laser diode 4-130, according to some embodiments.

In some implementations, the pump-module control circuit 5-300 can include one or more actuator control circuits (two shown) 5-351, 5-352. The actuator control circuits can receive control signals from the system board 5-320 to operate one or more actuators located on the mode-locked laser module 1-108. For example, a first actuator control circuit 5-351 can be configured to operate a first actuator 2-162 that rotates a laser window 2-128 in the laser cavity of the mode-locked laser 1-110. Operation of the first actuator can adjust cavity alignment and be used to improve mode locking of the laser 1-110. A second actuator control circuit 5-352 can be configured to operate a second actuator 2-162 that rotates a half-wave plate 2-160 on the laser module 1-108, for example. Rotation of the half-wave plate 2-160 can be used to control an amount of laser power converted to a frequency-doubled wavelength, for example.

According to some embodiments, control signals for the actuator circuits 5-351, 5-352 can be computed on the system board 5-320 based upon outputs from the clock-generation and laser-sensing circuit 5-350. Outputs from the clock-generation and laser-sensing circuit 5-350 can be produced by a fundamental sensor circuit 5-311 (which can include or connect to a photodiode 2-154 configured to sense a fundamental wavelength 21 from the laser 1-110), a frequency-doubled sensor circuit 5-312 (which can include or connect to a photodiode 2-182 configured to sense a frequency-doubled wavelength $\lambda_2$ produced from the laser's output pulses), and a diode pump sensor circuit 5-313 (which can include or connect to a photodiode 2-116 configured to sense a pump wavelength $\lambda_p$ used to excite the gain medium 1-105 in the laser 1-110). Accordingly, feedback control of the mode-locked laser 1-110 and frequency-doubled output power can be implemented by sensing laser operational and output parameters and applying signals via the actuator circuits 5-351, 5-352 that correct or improve operation of the mode-locked laser module 1-108. It will be appreciated that some embodiments can include additional sensor circuits and/or additional actuator control circuits for controlling the same and/or additional components on the compact mode-locked laser module 1-108.

Applications

One example use of the systems and methods for AM laser pulse train creation described in the present application is the detection of molecules, which is used in applications such as gene and protein sequencing. An exemplary system for using AM laser pulse trains for single-molecule detection is described below.

Referring to FIG. 1-3, the output pulses 1-122 in an AM laser pulse train output from a mode-locked laser module can be coupled into one or more optical waveguides 1-312 on the bio-optoelectronic chip 140. In some embodiments, the optical pulses can be coupled to one or more waveguides via a grating coupler 1-310, though coupling to an end of one or more optical waveguides on the bio-optoelectronic chip can be used in some embodiments. According to some embodiments, a quad detector 1-320 can be located on a semiconductor substrate 1-305 (e.g., a silicon substrate) for aiding in alignment of the beam of optical pulses 1-122 to a grating coupler 1-310. The one or more waveguides 1-312 and reaction chambers 1-330 can be integrated on the same semiconductor substrate with intervening dielectric layers (e.g., silicon dioxide layers) between the substrate, waveguide, reaction chambers, and photodetectors 1-322.

Each waveguide 1-312 can include a tapered portion 1-315 below the reaction chambers 1-330 to equalize optical power coupled to the reaction chambers along the waveguide. The reducing taper can force more optical energy outside the waveguide's core, increasing coupling to the reaction chambers and compensating for optical losses along the waveguide, including losses for light coupling into the reaction chambers. A second grating coupler 1-317 can be located at an end of each waveguide to direct optical energy to an integrated photodiode 1-324. The integrated photodiode can detect an amount of power coupled down a waveguide and provide a detected signal to feedback circuitry that controls the beam-steering module 1-150, for example.

The reaction chambers 1-330 can be aligned with the tapered portion 1-315 of the waveguide and recessed in a tub 1-340. There can be time-binning photodetectors 1-322 located on the semiconductor substrate 1-305 for each reaction chamber 1-330. A metal coating and/or multilayer coating 1-350 can be formed around the reaction chambers and above the waveguide to prevent optical excitation of fluorophores that are not in the reaction chambers (e.g., dispersed in a solution above the reaction chambers). The metal coating and/or multilayer coating 1-350 may be raised beyond edges of the tub 1-340 to reduce absorptive losses of the optical energy in the waveguide 1-312 at the input and output ends of each waveguide.

There can be a plurality of rows of waveguides, reaction chambers, and time-binning photodetectors on the bio-optoelectronic chip 1-140. For example, there can be 128 rows, each having 512 reaction chambers, for a total of 65,536 reaction chambers in some implementations. Other implementations may include fewer or more reaction chambers, and may include other layout configurations. Optical power from the mode-locked laser 1-110 can be distributed to the multiple waveguides via one or more star couplers or multi-mode interference couplers, or by any other means, located between an optical coupler to the chip 1-140 and the plurality of waveguides.

FIG. 1-4 illustrates optical energy coupling from an optical pulse 1-122 within a waveguide 1-315 to a reaction chamber 1-330. The drawing has been produced from an electromagnetic field simulation of the optical wave that accounts for waveguide dimensions, reaction chamber dimensions, the different materials' optical properties, and the distance of the waveguide 1-315 from the reaction chamber 1-330. The waveguide can be formed from silicon nitride in a surrounding medium 1-410 of silicon dioxide, for example. The waveguide, surrounding medium, and reaction chamber can be formed by microfabrication processes described in U.S. application Ser. No. 14/821,688, filed Aug. 7, 2015, titled "Integrated Device for Probing, Detecting and Analyzing Molecules". According to some embodiments, an evanescent optical field 1-420 couples optical energy transported by the waveguide to the reaction chamber 1-330.

A non-limiting example of a biological reaction taking place in a reaction chamber 1-330 is depicted in FIG. 1-5. In this example, sequential incorporation of nucleotides or nucleotide analogs into a growing strand that is complementary to a target nucleic acid is taking place in the reaction chamber. The sequential incorporation can be detected to sequence DNA. The reaction chamber can have a depth between about 150 nm and about 250 nm and a diameter between about 80 nm and about 160 nm. A metallization layer 1-540 (e.g., a metallization for an electrical reference potential) can be patterned above the photodetector to provide an aperture that blocks stray light from adjacent reaction chambers and other unwanted light sources. According to some embodiments, polymerase 1-520 can be located within the reaction chamber 1-330 (e.g., attached to a base of the chamber). The polymerase can take up a target nucleic acid 1-510 (e.g., a portion of nucleic acid derived from DNA), and sequence a growing strand of complementary nucleic acid to produce a growing strand of DNA 1-512. Nucleotides or nucleotide analogs labeled with different fluorophores can be dispersed in a solution above and within the reaction chamber.

When a labeled nucleotide or nucleotide analog 1-610 is incorporated into a growing strand of complementary nucleic acid, as depicted in FIG. 1-6, one or more attached fluorophores 1-630 can be repeatedly excited by pulses of optical energy coupled into the reaction chamber 1-330 from the waveguide 1-315. In some embodiments, the fluorophore or fluorophores 1-630 can be attached to one or more nucleotides or nucleotide analogs 1-610 with any suitable linker 1-620. An incorporation event may last for a period of time up to about 100 ms. During this time, pulses of fluorescent emission resulting from excitation of the fluorophore(s) by pulses from the mode-locked laser can be detected with a time-binning photodetector 1-322. In some embodiments, there can be one or more additional integrated devices 1-323 at each pixel for signal handling (e.g., amplification, read-out, routing, etc.). According to some embodiments, each pixel can include a single or multilayer optical filter 1-530 that passes fluorescent emission and reduces transmission of radiation from the excitation pulse. Some implementations may not use the optical filter 1-530. By attaching fluorophores with different emission characteristics (e.g., fluorescent decay rates, intensity, fluorescent wavelength) to the different nucleotides (A,C,G,T), detecting and distinguishing the different emission characteristics while the strand of DNA 1-512 incorporates a nucleic acid and enables determination of the genetic sequence of the growing strand of DNA.

According to some embodiments, an analytical instrument 1-100 that is configured to analyze samples based on fluorescent emission characteristics can detect differences in fluorescent lifetimes and/or intensities between different fluorescent molecules, and/or differences between lifetimes and/or intensities of the same fluorescent molecules in different environments. By way of explanation, FIG. 1-7 plots two different fluorescent emission probability curves (A and B), which can be representative of fluorescent emission from two different fluorescent molecules, for example. With reference to curve A (dashed line), after being excited by a short or ultrashort optical pulse, a probability $p_A(t)$ of a fluorescent emission from a first molecule may decay with time, as depicted. In some cases, the decrease in the probability of a photon being emitted over time can be represented by an exponential decay function $p_A(t)=P_{Ao}e^{-t/\tau_A}$, where $P_{Ao}$ is an initial emission probability and $\tau_A$ is a temporal parameter associated with the first fluorescent molecule that characterizes the emission decay probability. $\tau_A$ may be referred to as the "fluorescence lifetime," "emission lifetime," or "lifetime" of the first fluorescent molecule. In some cases, the value of $\tau_A$ can be altered by a local environment of the fluorescent molecule. Other fluorescent molecules can have different emission characteristics than that shown in curve A. For example, another fluorescent molecule can have a decay profile that differs from a single exponential decay, and its lifetime can be characterized by a half-life value or some other metric.

A second fluorescent molecule may have a decay profile that is exponential, but has a measurably different lifetime $\tau_B$, as depicted for curve B in FIG. 1-7. In the example shown, the lifetime for the second fluorescent molecule of curve B is shorter than the lifetime for curve A, and the probability of emission is higher sooner after excitation of the second molecule than for curve A. Different fluorescent molecules can have lifetimes or half-life values ranging from about 0.1 ns to about 20 ns, in some embodiments.

Figure 9:
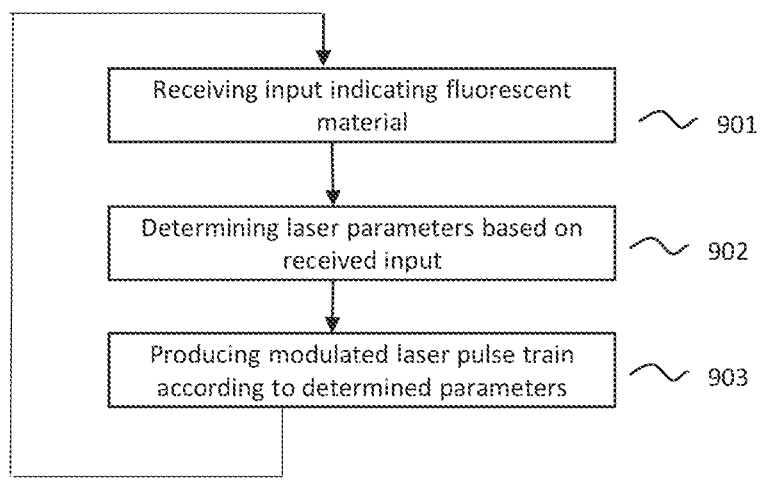
FIG. 9 is a flow chart illustrated a method of optimizing the parameters of an amplitude-modulated mode-locked laser, according to a non-limiting embodiment of the present application.

The inventors have recognized and appreciated that different fluorescent molecules respond differently to different configurations of AM laser pulse trains. Based on this, the inventors have further recognized and appreciated that these different response characteristics can be used to discern between the presence or absence of different fluorescent molecules and/or to discern between different environments or conditions to which a fluorescent molecule is subjected. For example, if it is known that the reaction chamber could contain one of four different possible fluorescent materials, each of which fluoresces most intensely in response to a different AM laser pulse train configuration, then it can be determined which material is present in the reaction chamber by testing all four different AM laser pulse train configurations and measuring the response. This technique is illustrated in FIG. 9. In step 901, an input is received indicating which fluorescent material is to be searched for. In step 902, the laser parameters (including but not limited to those discussed above) are adjusted to a known set of values that will produce an AM laser pulse train that will cause fluorescence in the target material. In step 903, the laser pulse train is produced. The method can then be repeated to produce different pulse trains for different materials of interest. The adjustment of the parameters may be accomplished by a computer that uses algorithms to determine the optimal laser parameters for different materials and then automatically adjusts the laser parameters by, for example, adjusting the control signals that control the laser current source.

The invention claimed is:

1. A system comprising:
    an instrument that receives a removable chip;
    the chip comprising:
        a plurality of pixels and a waveguide, each pixel including a sample well adapted to receive a sample, and a detector;
    the instrument comprising:
        a mode-locked laser comprising:
        at least one laser diode; and
        at least one laser cavity containing at least one gain medium;
        wherein the output of the laser is configured to produce a train of laser pulses optimized to produce fluorescence from the sample according to laser parameters whose values are selected based on input representing sample fluorescent material, the train of laser pulses being fed to the chip and delivered by the waveguide as excitation light to each sample well.

2. The system of claim 1, wherein the parameters are selected from the following list of parameters: peak amplitude, modulation shape, repetition rate of pulses, laser wavelength, photon energy, pulse duty cycle, pulse width, and modulation duty cycle.

3. The system of claim 1, wherein a modulation shape of the laser pulses is chosen from a set of shapes including a square, triangle, sinusoid, and an arbitrary shape with varying pulse rise times, pulse fall times, and pulse duty cycles.

4. The system of claim 1, wherein an amplitude of the laser pulses in the laser pulse train modulates substantially periodically, resulting in a periodically modulated laser pulse train.

5. The system of claim 4, further including an acousto-optic modulator that produces at least in part the modulation of the laser pulse train.

6. The system of claim 4, further including an electro-optic modulator that produces at least in part the modulation of the laser pulse train.

7. The system of claim 4, further including a mechanical optical chopper that produces at least in part the modulation of the laser pulse train.

8. The system of claim 4, further including a pulse picker that produces at least in part the modulation of the laser pulse.

9. The system of claim 1, further including a gain crystal that comprises a material selected from the list of: neodymium vanadate ($Nd^{3+}$: $YVO_4$); a vanadate; and a host material.

10. The system of claim 1, further comprising a saturable absorber mirror mounted on a plate at an end of the laser cavity, wherein the plate is configured to be adjusted with only two degrees of freedom which do not include angle adjustments with respect to an optical axis of an intracavity beam of the laser cavity that is incident on the saturable absorber mirror.

11. The system of claim 1, further comprising:
a first focusing optic located within the laser cavity; and
a laser window or optical flat located within the laser cavity, wherein the first focusing optic and laser window or optical flat are arranged to adjust an incident angle of an intracavity beam on a saturable absorber mirror by rotating the laser window or optical flat.

12. The system of claim 10, further comprising a cavity length extending region located within the laser cavity between the gain medium and the saturable absorber mirror, wherein the cavity length extending region folds the intracavity beam at least four times.

13. The system of claim 12, wherein the cavity length extending region comprises:
a first reflector; and
a second focusing reflector located between the saturable absorber mirror and the gain medium, wherein the first reflector and the second focusing reflector fold the intracavity beam three times on successive reflections.

14. A gain-switched laser comprising:
at least one laser cavity containing at least one gain medium;
wherein the output of the laser is configured to produce a train of interleaved laser pulses of different color excitation, which when incident upon a fluorescent material produces fluorescence therefrom; and
wherein the fluorescence is optimized by selecting a value of at least one parameter of the laser pulse train based on received input regarding the fluorescent material.

15. A method of using the gain-switched laser of claim 14, comprising the steps of:
applying the laser pulse train to a fluorescent dye; and
identifying the dye by examining the relative absorption of the dye at the different color excitations of the pulses in the laser pulse train.

16. A system comprising:
an instrument that receives a removable chip;
the chip comprising:
a plurality of pixels and a waveguide, each pixel including a sample well adapted to receive a sample, and a detector;
the instrument comprising:
a laser light source that produces an amplitude modulated laser pulse train having ultrashort laser pulses having a pulse width of 100 picoseconds or less and individual pulses of varying amplitude, which when incident upon a fluorescent molecule within the sample well produces fluorescence therefrom;
wherein the fluorescence is optimized by selecting a value of at least one parameters of the laser pulse train based on received input representing the fluorescent material within the sample well.

* * * * *